United States Patent
Dash et al.

(10) Patent No.: US 7,277,768 B2
(45) Date of Patent: Oct. 2, 2007

(54) METHOD FOR PRODUCTION DESIGN AND OPERATIONS SCHEDULING FOR PLATE DESIGN IN THE STEEL INDUSTRY

(75) Inventors: Sanjeeb Dash, Croton on Hudson, NY (US); Jayant R. Kalagnanam, Tarrytown, NY (US); Chandrasekhara K. Reddy, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 10/981,588

(22) Filed: Nov. 5, 2004

(65) Prior Publication Data

US 2006/0100727 A1    May 11, 2006

(51) Int. Cl.
*G06F 19/00* (2006.01)

(52) U.S. Cl. .................. 700/97; 700/146; 700/171; 703/2

(58) Field of Classification Search .............. 700/97, 700/146, 171; 703/2, 5, 7
See application file for complete search history.

(56) References Cited

U.S. PATENT DOCUMENTS

| | | | | |
|---|---|---|---|---|
| 7,158,922 B2 * | 1/2007 | Sadagopan et al. | ............. | 703/2 |
| 2004/0158340 A1 * | 8/2004 | Fischer et al. | ................ | 700/97 |
| 2006/0253214 A1 * | 11/2006 | Gross | ........................ | 700/97 |

* cited by examiner

*Primary Examiner*—Leo Picard
*Assistant Examiner*—Douglas S Lee
(74) *Attorney, Agent, or Firm*—Whitham, Curtis, Christofferson & Cook, PC; Stephen C. Kaufman

(57) ABSTRACT

An automated method optimally designs plates to satisfy an order book at a steel plant so as to maximize the yield of the plates designed while using capacity fully to reduce the production of surplus slabs or plates, and satisfy order deadlines. Our method consists of four main components: (1) mother plate design, (2) slab design, (3) cast design, and (4) material allocation. A column generation framework for mother plate design is used where the problem is decomposed into a master problem and a subproblem. The master problem is used to evaluate packing patterns that should be used to fulfill the order book and the subproblem generates potential one-dimensional and two-dimensional feasible packing patterns as candidates to be evaluated by the master problem. The solution to the master problem produces a list of mother plates that need to be produced. These mother plates are transformed into candidate slabs, which are represented via an interval graph. The maximal cliques in the interval graph—maximal subsets of slabs which can be grouped together to form casts—are enumerated to generate candidate casts, from which redesign information is sent to the plate/slab design processes. The cast design process is integrated with the plate design/slab design processes in the sense that information is passed from the plate/slab design processes to the cast design process and vice versa. Finally, our method has a material allocation component to assign order plates to inventory mother-plates and slabs.

11 Claims, 19 Drawing Sheets weight width
Max $\sum_i \{w_i x_i - (W_{max} - W_i) L_i t_i \rho\} - L_{surplus}$ Such that $22m <= \sum_i L_i x_i + L_{surplus} <= 45m$   length of mother plate in (22, 45m)

$t_{min} >= t_{max} - 0.01$   thickness of all plates within 0.01

$L_{surplus}$ is the surplus on slab

Figure 8

METHOD FOR PRODUCTION DESIGN AND OPERATIONS SCHEDULING FOR PLATE DESIGN IN THE STEEL INDUSTRY

BACKGROUND OF THE INVENTION

1. Field of the Invention

The present invention generally relates to automated optimization of manufacturing processes and, more particularly, to a method for production and operations scheduling for plate design in the steel industry.

2. Background Description

Steel plants produce a variety of steel products, including heavy rectangular plates. Rectangular plates are used widely in ship-building, among other industries. In modem steel plants, such plates are made-to-order according to customer needs, and thus have different dimensions, thicknesses and quality. An important problem steel manufacturers need to solve is how to efficiently transform molten steel into an order book of rectangular steel plates, given various constraints on the intermediate steel processes and equipment, and waste as little metal as possible.

In the prior art, the steel industry solved the above problem manually, or by ad-hoc computer methods. The drawback of a manual approach is that changes in manufacturing parameters cannot be easily handled, and large order books cannot be handled in an optimal fashion. Existing computer methods which attempt to solve this problem do not produce optimal or near-optimal solutions. This is because they do not systematically explore many different possible solutions but, typically, use heuristics to create a single solution. The existing heuristics are designed with the goal of producing near-optimal solutions but have no way of guaranteeing this outcome. Further, the existing computer methods require a substantial amount of human interaction, and therefore changes in manufacturing parameters cannot be easily handled, and large order books cannot be handled in an optimal fashion. Also the design process is time-consuming because of manual intervention.

SUMMARY OF THE INVENTION

It is therefore an object of the present invention to provide an automated method which will allow manufacturers of rectangular steel plates to optimally produce plates and reduce wastage of material.

It is another object of the invention to provide a method that will allow steel manufacturers to easily and quickly deal with changes in order books, or changes in many manufacturing parameters, of rectangular plates.

According to the invention, an automated method is used to optimally design plates to satisfy an order book at a steel plant. The automated method also specifies the sequence of operations required to create the designed plates, given various constraints on machines and manufacturing parameters. The main objective of this optimization is to maximize the yield of the plates designed while using capacity fully to reduce the production of surplus or waste material, and satisfy order deadlines. The invention has four main components: (1) mother-plate design, (2) slab design, (3) cast design, and (4) material allocation. These components correspond to a logical division of the production processes involved in the manufacture of rectangular steel plates. The invention uses a column generation framework for the mother-plate design component, where the mother-plate design problem is decomposed into a master problem and a sub-problem. The master problem is used to evaluate packing patterns (or arrangements of order plates on larger plates called mother-plates) that should be used to fulfill the order book and the sub-problem generates potential one-dimensional and two-dimensional feasible packing patterns as candidates to be evaluated by the master. The mother-plate design component solves the master problem above and creates a list of mother-plates that need to be produced. The slab design component transforms these mother-plates into an interval graph representing the candidate slabs to be cast which (in the cast design component) is subsequently solved for maximal subsets to generate candidate casts. Finally, the material allocation component uses a column generation framework very similar to the one in the mother-plate design component to allocate order plates to mother-plates and slabs already in inventory.

The present invention allows steel manufacturers to handle order deadlines in a way which is better than current practice and to minimize wastage of material in an automated fashion and to get guaranteed optimal or "near optimal" solutions. Also, the invention allows manufacturers to easily and quickly deal with changes in order books or changes in many manufacturing parameters.

BRIEF DESCRIPTION OF THE DRAWINGS

The foregoing and other objects, aspects and advantages will be better understood from the following detailed description of a preferred embodiment of the invention with reference to the drawings, in which:

FIG. 8 is a diagram illustrating the column generation approach to the master problem according to the invention;

DETAILED DESCRIPTION OF A PREFERRED EMBODIMENT OF THE INVENTION

Figure 1:
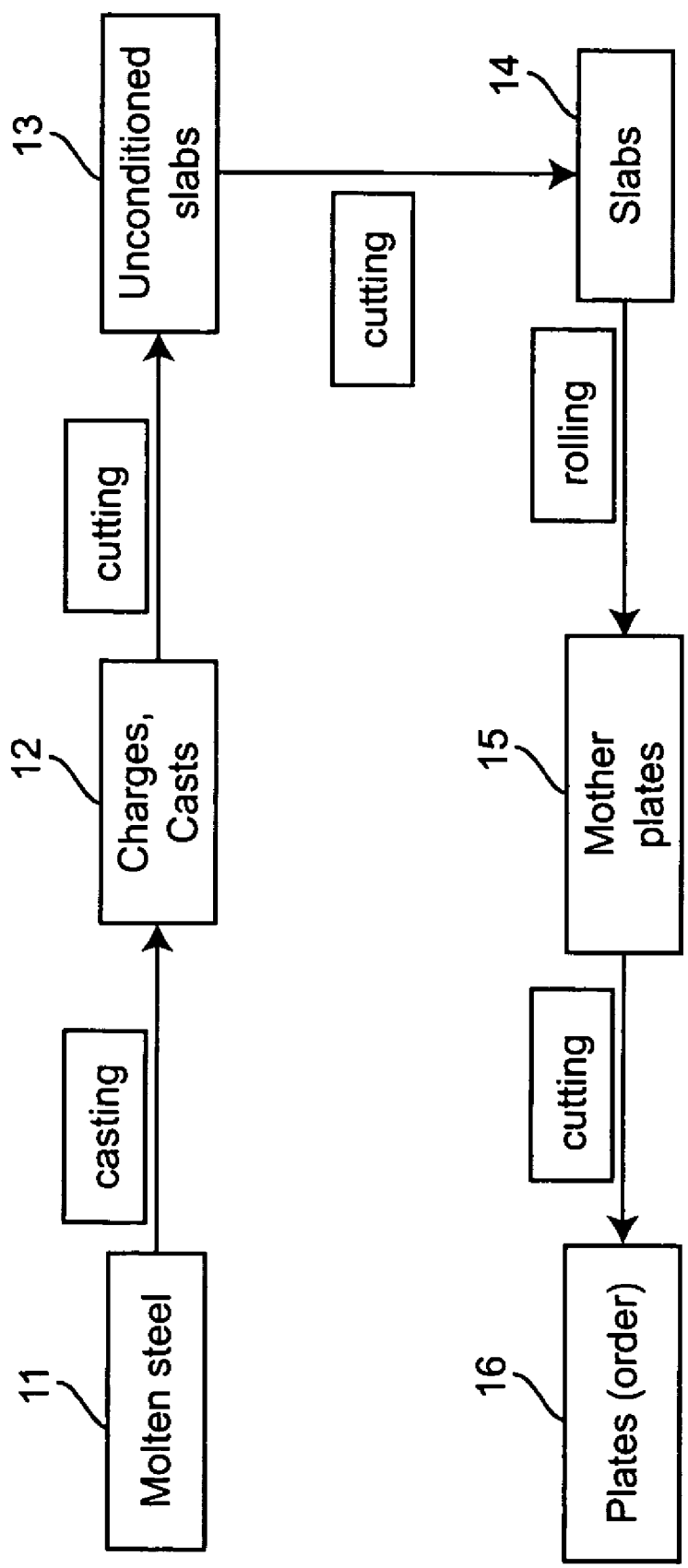
FIG. 1 is a flow diagram illustrating an overview of the problem solved by the invention.

Referring now to the drawings, FIG. 1 gives an overview of the problem. Molten steel 11 is poured into molds to produce charges and casts 12. The charges and casts 12 are cut to produce unconditioned slabs 13 which, in turn, are cut to produce slabs 14. The slabs 14 are rolled in plate factories to produce mother-plates 15. These mother-plates are cut to produce the plates 16 for customer orders. The goals of this process are to satisfy customer orders, minimize surplus and maximize yield. Yield is defined as that fraction of input material used to fill orders. There are constraints on the several processes, on the intermediate products, and the priority of individual orders which impact the goals.

Figure 2:
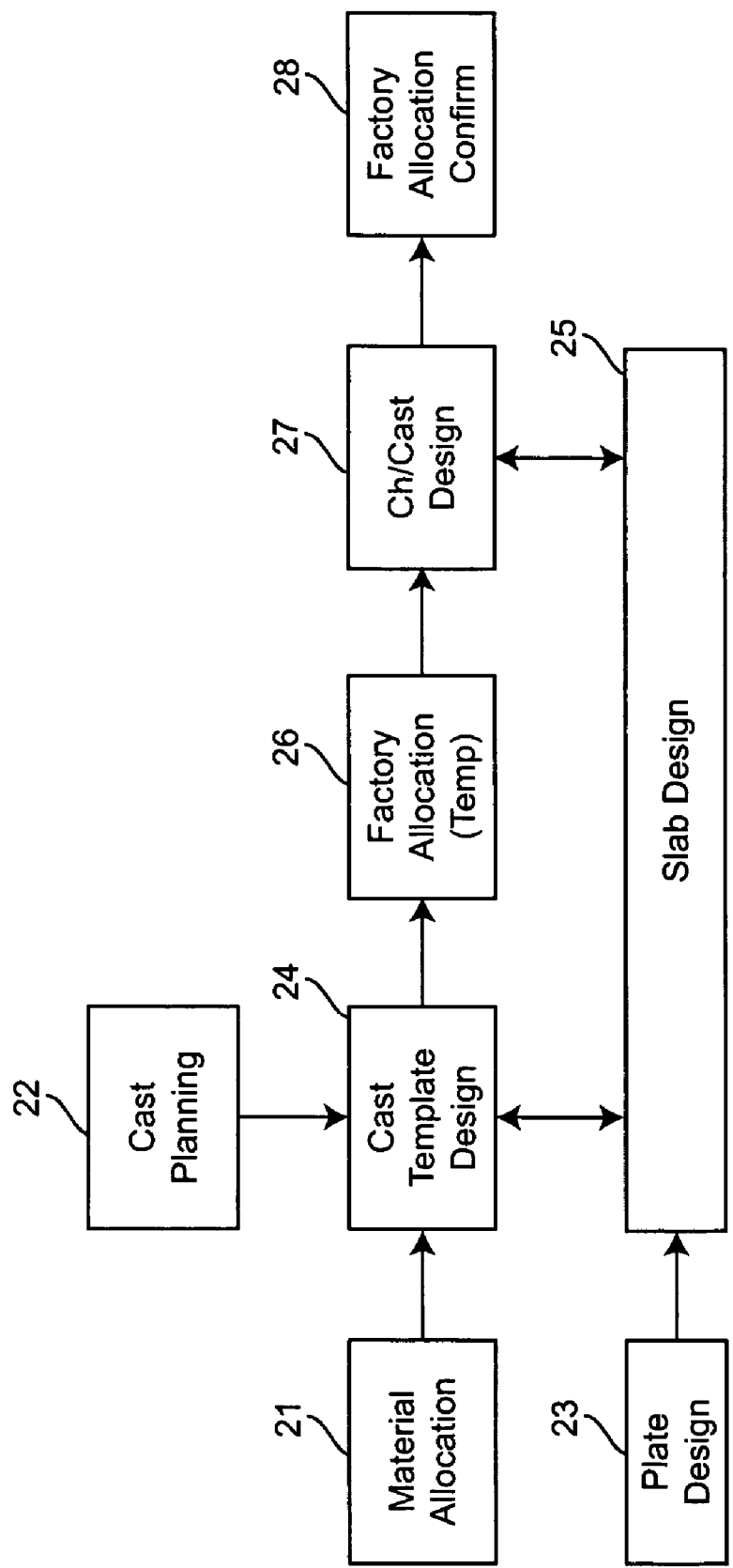
FIG. 2 is a block diagram showing the production design process of heavy plate.

In FIG. 2, there is shown a block diagram of the production design process of heavy plate. The process has as inputs material allocation 21, cast planning 22, and mother-plate design 23. Material allocation 21 and cast planning 22 are input to the cast template design process 24 which also receives input via slab design process 25 of the mother-plate design 23. The result of the cast template design 24 is used for an initial factory allocation 26 which is then input to the charge/cast design process 27. This process also receives input from the slab design process 25. The output of the charge/cast design process 27 is a confirmation of factory allocation 28. Throughout this document, in the context of our invention, we refer to cast design and cast template design interchangeably. Also, the terms plate design and mother-plate design are used interchangeably.

The invention provides a method for optimally producing plates to satisfy an order book or rectangular plates at a steel plant. The main objectives of this optimization are to maximize yield rate for plates designed and to maximize the on-time completion of customer orders while using capacity fully to reduce the production of surplus slabs or plates or steel.

Figure 3:
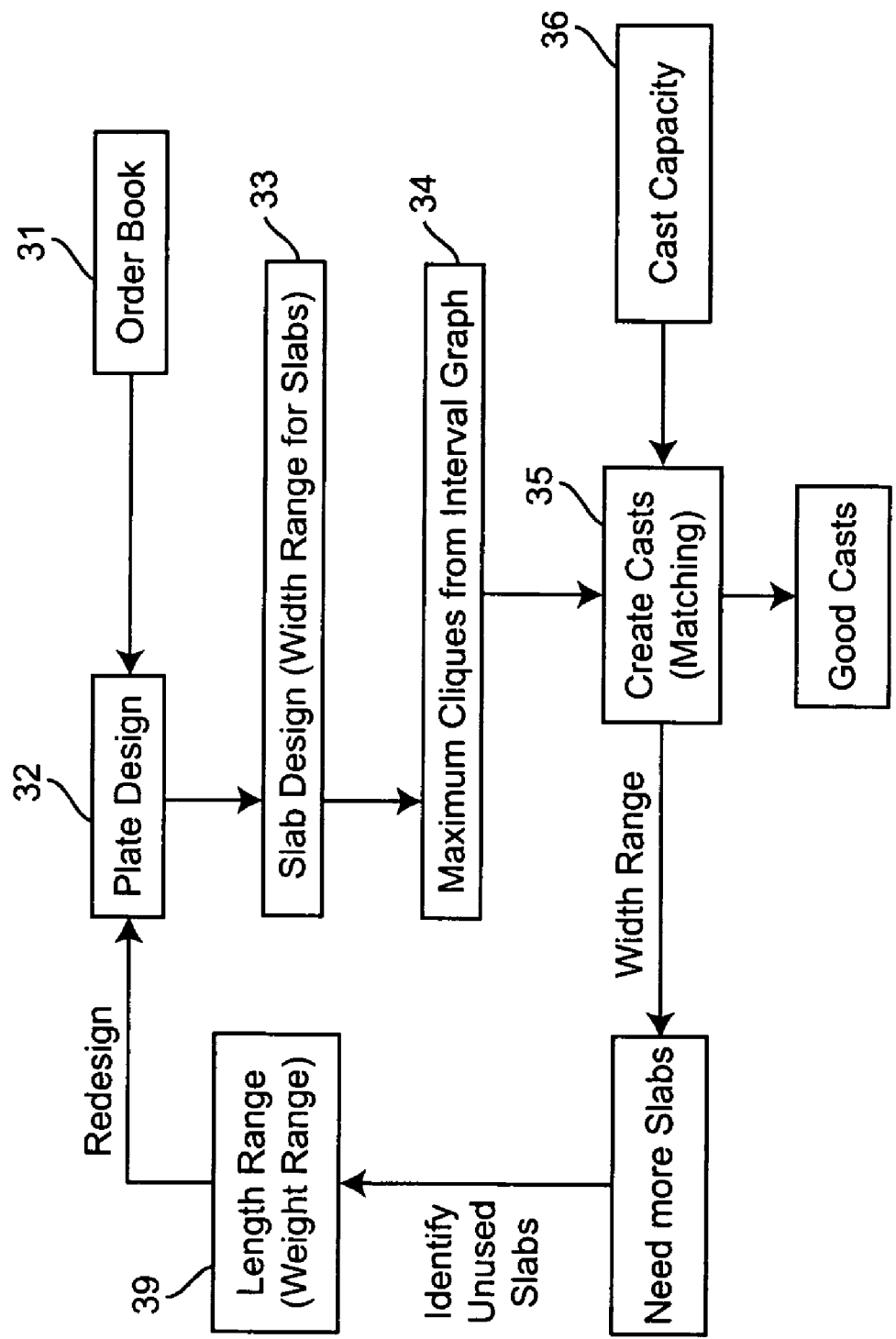
FIG. 3 is a flow diagram illustrating the process of integrated cast template and plate design.

FIG. 3 illustrates the process of integrated cast template and plate design. The order book 31 is the primary input to plate design 32. Slab design 33 is based on the output of plate design 32 and specifies a width range for slabs. The slab design 33 determines the maximal cliques as derived from an interval graph in step 34. This, in turn, is one input to the process to create casts 35, the other input of which is cast capacity 36. The process may require more slabs as output at step 37, and this is fed back with length range and, optionally, weight range 38 for redesign to plate design 32.

The invention for production of plates as illustrated in FIG. 3 consists of four main components:
a) mother-plate design,
b) slab design,
c) cast design, and
d) material allocation.

The invention uses a column generation framework for components (a) where the problem is decomposed into a master problem and a subproblem. The master problem is used to evaluate packing patterns that should be used to fulfill the order book, and the subproblem generates potential one-dimensional and two-dimensional feasible packing patterns as candidates to be evaluated by the master. The solution to the master problem produces a list of mother plates that need to be produced. These mother plates are then transformed into an interval graph representing the candidate slabs to be cast which is subsequently solved for maximal subsets to generate candidate casts. A column generation framework is used to tackle component (d), material allocation, above.

We now provide additional details of the processes targeted by our invention. The plate manufacturing process converts molten steel into an order book of rectangular plates through a sequence of steps. An order book is a list of customer orders for plates. Each customer order is for a number of identical rectangular plates of a given dimension and steel grade. In addition customer orders could specify delivery dates, and tolerances on the dimension and quantity of the desired plate.

Casting: A "charge" is a certain amount (usually within a permitted range) of molten steel with an associated steel grade. Multiple charges are grouped together (arranged in a sequence) via a caster into a "cast" which consists of one or more "strands". A strand can be viewed as a long rectangular metal object with length typically much larger than its width. Different strands from in a cast have different widths. The width and thickness of a strand can be controlled in a caster. The length depends on the volume of molten metal in the charge. In this description, it is assumed that a "cast" has one "strand", making the two terms identical.

Slab cutting: Each cast is typically cut (across its width) into a number of "slabs" which are also rectangular and have the same width, thickness, and broad metal properties as the cast. More precisely a slab has the same metal properties as the charge in the cast from which it is cut. Slabs can be chemically treated to acquire slightly different chemical properties subsequently. Sometimes casts are first cut into larger units called unconditioned slabs, which are then cut into slabs.

Slab rolling: Slabs are sent to plate factories, where they are converted into thinner rectangular objects called mother-plates by passing the slabs through rolling machines. There are typically daily rolling capacity limits on these machines and plate factories. The rolling process does not change the volume or weight of steel in a slab; thus a slab and a mother-plate rolled from it have different dimensions but the same volume and weight.

Plate cutting: The mother-plates are sliced or cut using either mechanical cutting machines (called "shears") or gas-cutting machines into constituent order plates. A sequence of "guillotine cuts" (cut across the length or width of a plate) is applied to cut the mother-plate into order plates. After cutting, a part of the mother-plate is unusable, as it does not correspond to any order plate. The currently unusable part of the mother-plate may be usable in the future for future orders, in which case it is retained as surplus, otherwise it is thrown away as wasted metal. The specific orders cut out are chosen partly on the basis of their delivery date and other properties of the orders. The orders cut out from a mother-plate have essentially the same thickness as the mother-plate and the same metal properties.

Many of the machines mentioned above have daily capacity limits, such as the shears, the gas-cutting machines, the slab-rolling machines; plate factories, and casters. There are also constraints on the slab rolling and plate cutting machines which restrict the geometry of the slabs, mother-plates and orders cut from mother-plates.

The invention provides an integrated method to come up with precise instructions on how to fulfill orders in an order book of rectangular plates by a sequence of casting, slab cutting, slab rolling, and plate cutting steps. Each of the steps specified by the invention satisfies appropriate manufacturing constraints.

Figure 4:
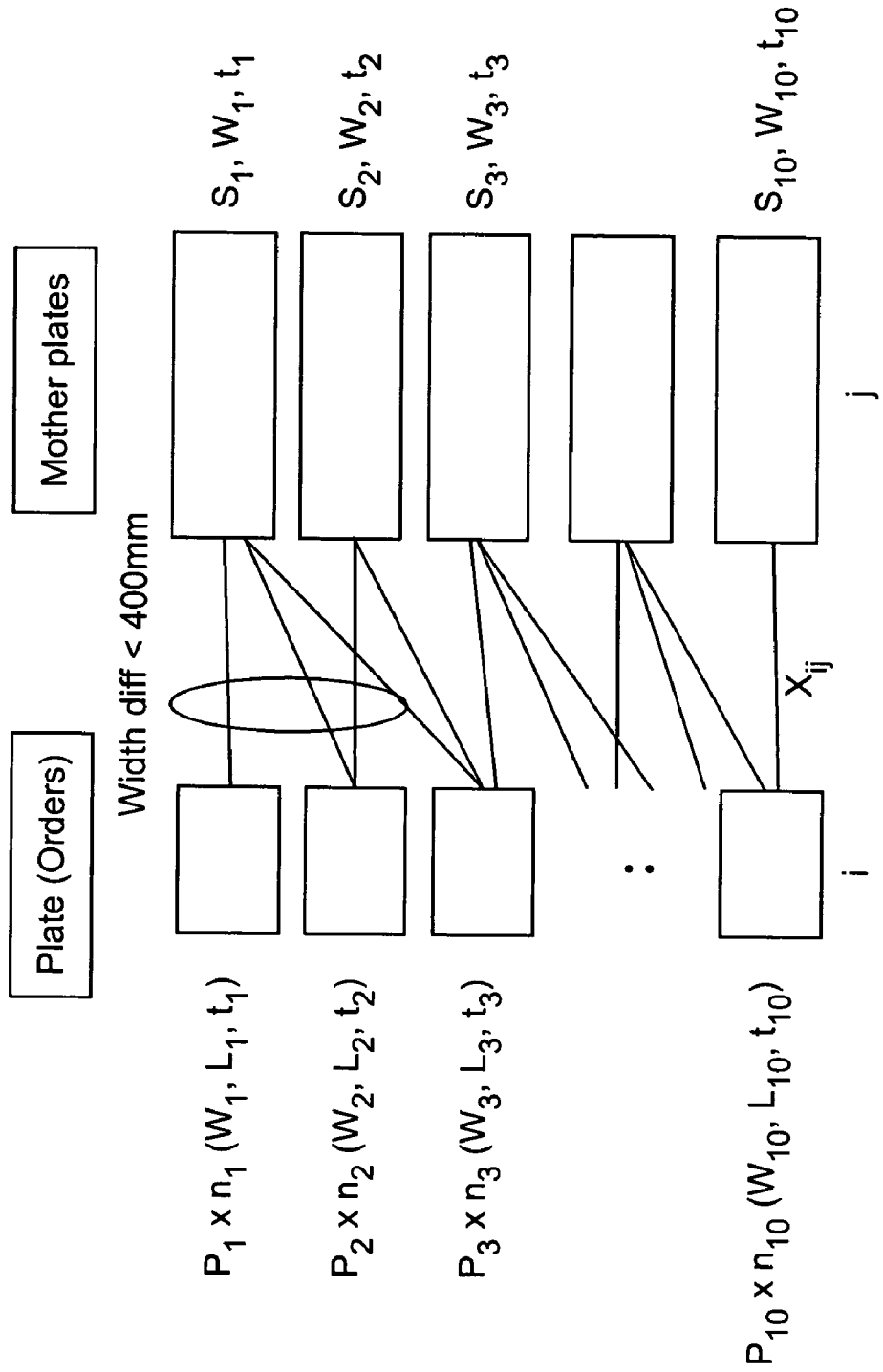
FIG. 4 is a block diagram of the plate design process illustrating that multiple compatible plates can be placed in a mother plate if their width difference is less than 400 mm.

FIG. 4 illustrates a plate packing constraint, or one of the many constraints which restrict the collection of orders or order plates which can be cut from (or "packed" on) a single mother-plate, in particular the "width difference constraint". In a simple multi-order plate, the order plates packed on a mother plate cannot have their widths differ by more than a specified parameter, here 400 mm.

The left part of the FIG. 4 depicts a set of order plates, shown as rectangles arranged vertically. The symbols P1, P2, etc. stand for different plate orders. Each plate order has an associated customer demand, width, length and thickness; n1 represents the number of identical plates to be manufactured for P1, L1 its length, W1 its width, and t1 its thickness, in addition to other parameters such as grade. Order plates are "compatible" if their grade, thickness and other parameters do not prevent them from being packed together on a mother-plate.

The right part of FIG. 4 depicts a set of mother-plates, shown as rectangles arranged vertically. The symbol S1 refers to the first mother-plate, S2 to the second, and so on. Each mother-plate has a width and thickness; W1 is the width of S1, and t1 its thickness. A line from an order plate to a mother-plate indicates that the order-plate can be packed on the mother-plate. Thus, P1 can be packed on S1, and so forth. The circle around the lines from plates P1, P2, P3 to S1, indicates that these order plates are "compatible" and can be packed together on S1.

The plate design component starts with an order book and creates a list of mother-plates along with the positions of order plates on each mother-plate. It can also specify the plate factory each mother-plate should be manufactured in, if needed. The mother-plates satisfy various geometrical constraints (such as on length and width) in addition to constraints on the combination of orders on a mother-plate.

To obtain such an output, the invention uses a column generation framework, consisting of a master problem and a sub-problem. The sub-problem tackles the issues of putting together (i.e., "packing") a number of order plates into a mother-plate in a feasible fashion (satisfying the constraints mentioned above). This is illustrated in FIGS. 5 and 6.

Figure 5:
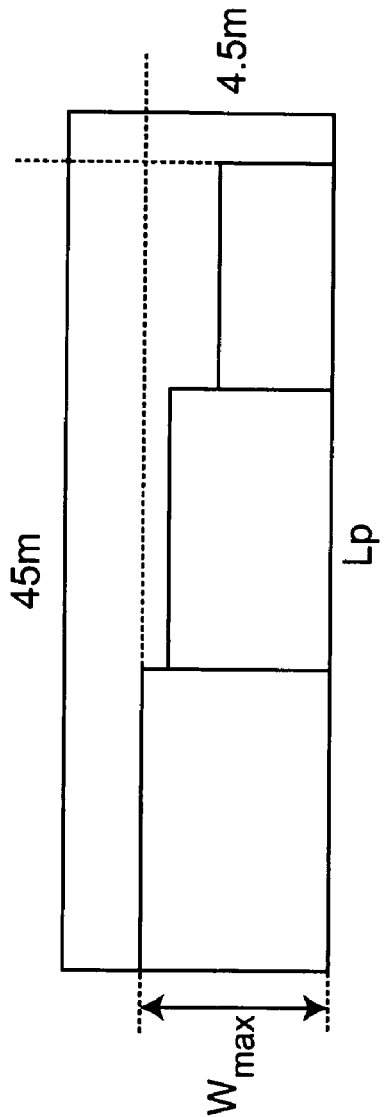
FIG. 5 is a diagram illustrating the mathematical formulation of a simple, multi-order plate.
Figure 6:
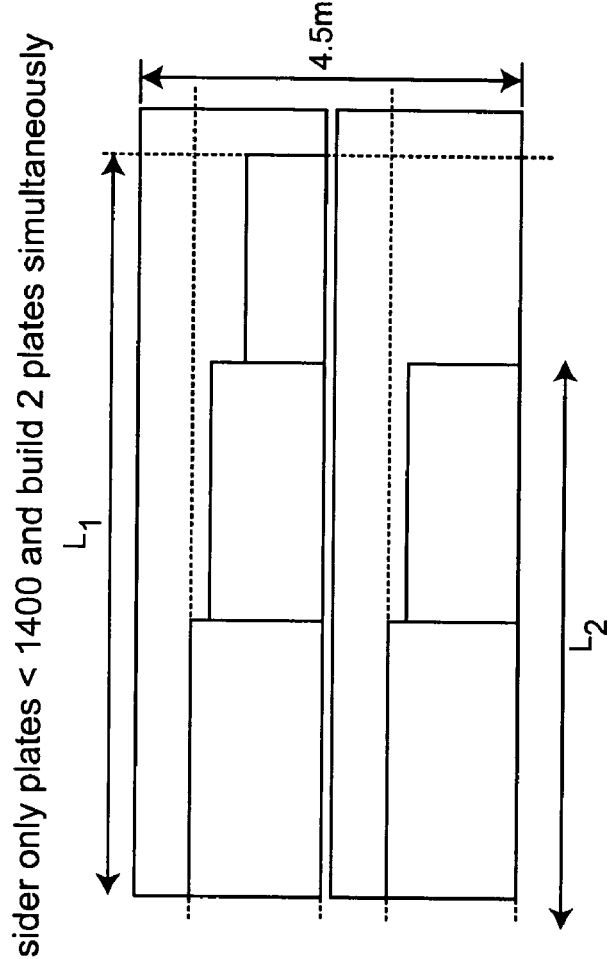
FIG. 6 is a diagram illustrating the mathematical formulation of a more complex, mosaic plate.

FIG. 5 shows a mathematical formulation for obtaining a simple pattern (or a simple multi-order mother plate) assuming two constraints on feasible mother-plate patterns. For example, mother-plates could be restricted to have a length between 22 m and 45 m, and the difference of the thicknesses of all order plates on a mother-plate could be restricted to be less than 0.1 mm. In the first constraint, there is a variable "Xi" for every order "i" with length "Li", which counts how many copies of the order should be placed on a mother-plate. The equation says that the sum of the lengths of orders on a mother-plate plus the length of the surplus plates added must lie between 22 m and 45 m. The second constraint says that the difference between the maximum thickness and minimum thickness of orders on a mother-plate is less than or equal to 0.1 mm. The goal is to create a mother-plate satisfying the above two constraints while maximizing an objective function. The objective function computes the weight of the order plates minus the total waste minus the length of the surplus plates.

The mother-plates created by the sub-problem are candidates for the master problem to consider; only a small fraction will ultimately be chosen by the master problem. Orders can be packed onto mother-plate in two types of patterns, mosaic patterns and simple patterns.

In a simple pattern as illustrated in FIG. 5, there are a number of order plates arranged along the length of the mother-plate, but not more than one along the width of the mother-plate. For such patterns, known algorithms are used, namely: FBS (First-Best Strip), KPOG (KnaPsack with fixed Orientation and Guillotine cuts). See A. Lodi, S. Martello and D. Vigo, "Heuristic and Meta-Heuristic Approaches for a Class of Two-Dimensional Bin Packing Problems", INFORMS Journal on Computing, 11 (1999), pp. 406-419. There are many other algorithms from the literature which can be adapted to generating feasible simple patterns; the appropriate algorithms will be determined by the application-specific context (e.g., the sort of geometric constraints imposed).

Figure 7:
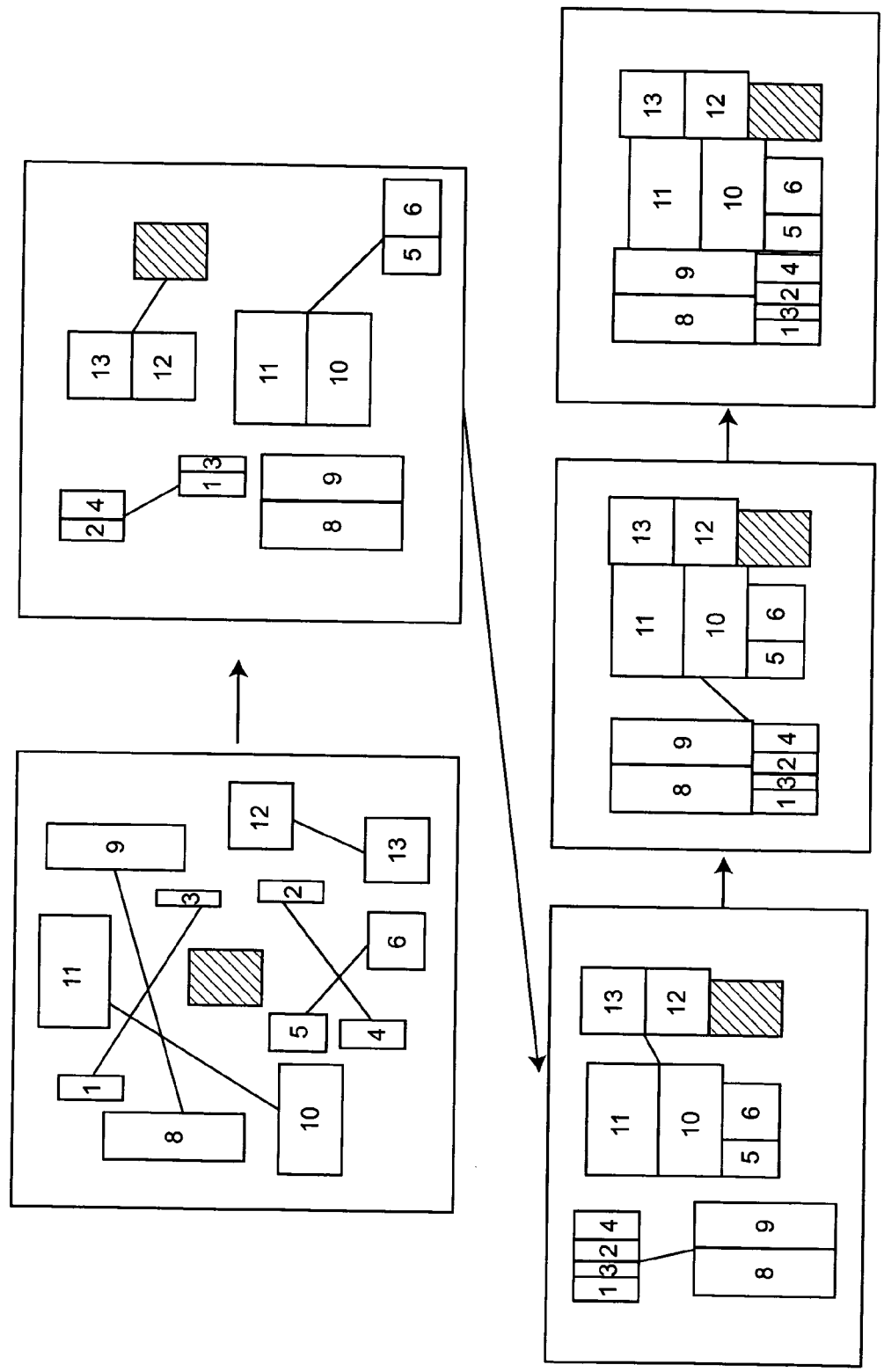
FIG. 7 is a diagram showing the process of non-bipartite weight matching.

Mosaic patterns, as shown in FIG. 6, could have more than one order side by side along the width of the mother-plate. FIG. 6 shows a mathematical formulation for obtaining a mosaic pattern. As there is more than one order along the width of the mother-plate (two in the figure), some additional constraints over and above the ones in FIG. 5 are needed. FIG. 6 illustrates one such constraint. In the case that a two layer mosaic plate is being made (a layer is essentially a simple pattern, and two simple patterns are placed side by side) it asks for the differences in the lengths of the layers to be as small as possible. To obtain mosaic patterns FIG. 7 shows an implementation of a non-bipartite weighted matching algorithm (NBWM), as used in the cutting-stock literature, as well as FBS and KPOG and other algorithms. See reference A. Fritsch and O. Vomberger, "Cutting Stock by Iterated Matching", Operations Research Proceedings, Selected Papers of the Int. Conf. on OR 94, U. Derigs. A. Bachem and A. Drexl, Eds., Berlin pp. 92-97, 1995.

FIG. 7 illustrates the operation of the "Nonbipartite weighted matching" (NBWM) algorithm in the context of mosaic pattern generation. The shaded rectangular boxes stand for order plates, groups of order plates placed adjacent to each other represent partially built mother-plates. A straight line joining a pair of order plates indicates that they can be packed together on a mother-plate (i.e., they are "compatible", as described in FIG. 4). Such a line (or the pair) has an associated "weight" value which measures the desirability of packing the associated orders together. A straight line joining a pair of partially built mother-plates indicates that they can be put together on a mother-plate (i.e., they are "compatible"), such lines also have "weight" values. Each unshaded box shows a stage of the algorithm, with arrows showing their sequence. In the initial stage (top left box), there is a straight line between each pair of "compatible" orders with a "weight". The NBWM algorithm is used to calculate the collection of pairs of orders, where no two pairs have a common order, such that the sum of the weights of the pairs in the collection is maximum among all collections. This results in the second stage (top right box), where pairs of orders have been put into partial mother-plates (some orders are not matched to any others). The new straight lines represent pairs of "compatible" plates and their "weights" are re-computed. The NBWM algorithm is again applied to get to the bottom left box. This overall process is repeated till one or more complete mother plates are available (bottom right box).

In addition, orders can have certain numerical values assigned to them by the master problem, which represent abstract profit values. Typically, in initial invocations to the sub-problem, these values are identical for all orders, but later they vary by orders. When these abstract profit values are identical, the objective of the sub-problem is to create feasible mother-plate patterns (which are also desirable with respect to various criteria such as amount of wasted metal on the mother-plates). When these abstract profit values are not identical, the sub-problem solves the problem of creating mother-plates such that the sum of the profits of packed order plates is maximized. Profit-sensitive variations of FBS and KPOG are used in the preferred embodiment of the invention; however, many other algorithms in the literature can be adapted to this end.

An important point to note is that the subproblem creates a mother-plate pattern, rather than a fixed mother-plates; the master problem can choose to use the pattern many times over. The master problem tackles the issue of repeatedly invoking the sub-problem to get a set of candidate mother-plates, and then choosing the best "feasible" subset of these mother-plates. If necessary, the master problem can also assign the mother-plates to be manufactured in various plate factories. Here "feasible" means that if the chosen mother-plates were actually manufactured from corresponding slabs in plate factories specified by the master problem, various machine capacity constraints would not be violated, and no order would be overfilled. The objective of the master problem is to maximize the yield of the mother-plates designed, while fulfilling the order book and minimizing surplus, and also maximizing the on-time completion of orders.

Figure 8:
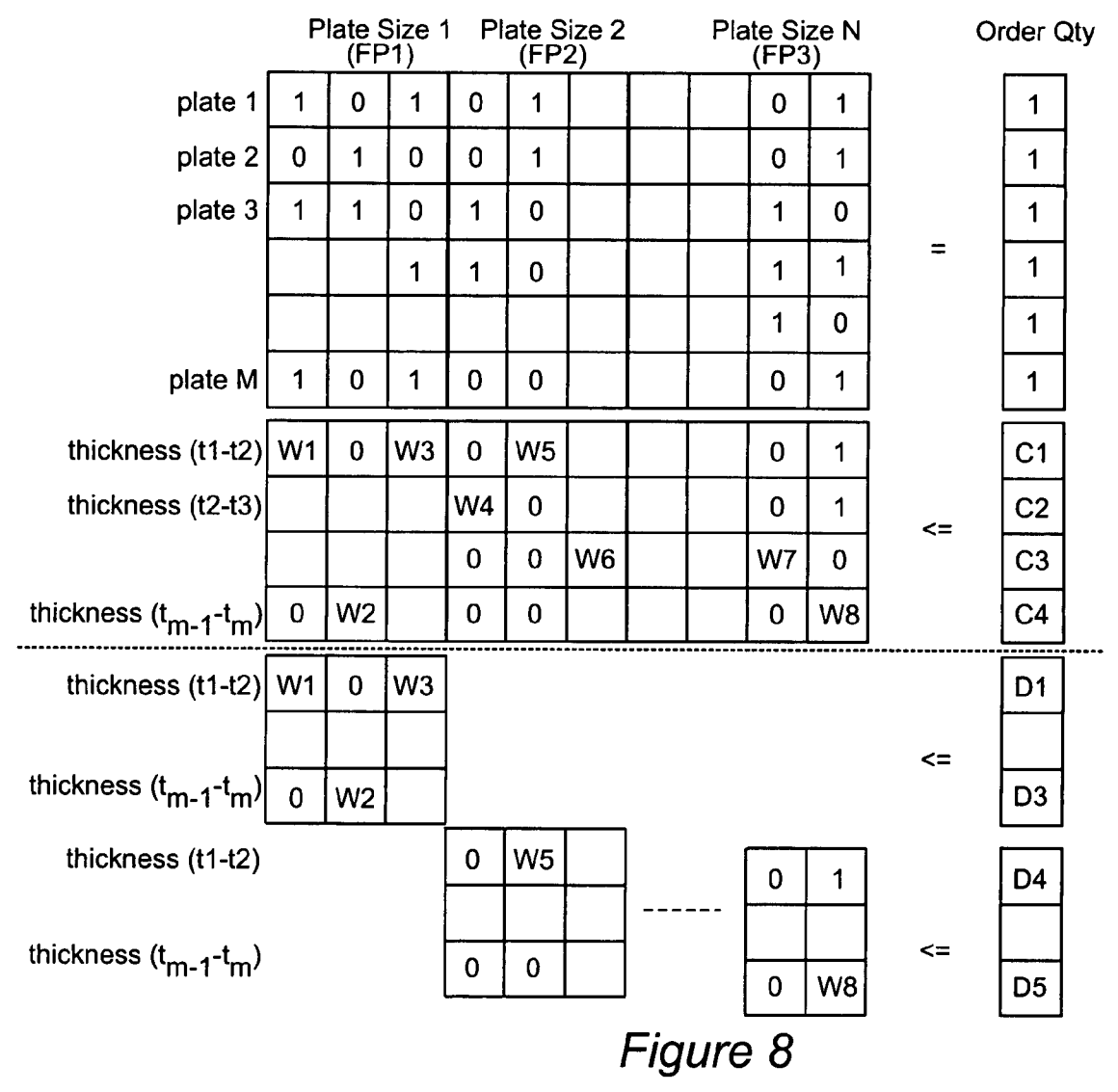

The master problem chooses a subset by solving by finding an 'integer solution' of a "master linear program" (abbreviated as MLP), as generally illustrated in FIG. 8. Here 'linear program' is an abbreviation for 'linear programming problem'. Each column stands for a mother-plate pattern. Each column has an associated variable. The value of a column variable indicates how many times the associated mother-plate pattern is to be used. In an 'integer solution', every column variable takes on an integral value, whereas in a 'fractional solution', the column variables can take on fractional values (such as '1.5' say). Rows represent constraints. The first M rows stand for the order plates. They stand for how many plates of an order are to be manufactured. Subsequent rows stand for slab (or mother-plate) thickness ranges and say how much weight of slabs (mother-plates) should be manufactured with a given thickness range. A number in each row of a column represents how much of a given capacity is used up when one unit of that pattern is manufactured. For a given order row, the number in the column gives the number of plates of that order contained in the mother plate pattern.

For example, the first mother-plate pattern has one plate of the first order. The numbers in the rows after the order rows represent slab weights. For example, W1 stands for the weight of the first mother-plate pattern. A zero in these rows simply means that the mother-plate pattern cannot be manufactured from slabs of the thickness for the row. The numbers in the right-most column specify capacities; either desired number of plates for an order row, or a capacity (given in weight) on slabs of a given thickness. The chosen mother-plate patterns must be such that no capacities specified in the right-most column are exceeded.

The MLP has an associated objective function. Given a subset of mother-plates (as specified by values of the associated column variables), the objective function assigns a numerical value (called "objective value") to the subset. This numerical value measures desirability and higher values indicates higher desirability. The precise values assigned by the objective function or application specific. For example, if the objective of the plate packing process is to create plates with high yield-rate, we can encode this in the objective function. In general, as we are dealing with a linear programming problem, the objective function assigns a single number to each mother-plate pattern. If a mother-plate pattern is used twice, then the associated objective function value is multiplied by two. If a set of mother-plate patterns are used, the objective function values for different mother-plate patterns are added up to get the final objective value.

The goal of the master problem is to obtain the most numerically desirable subset of mother-plates from a set of mother-plates generated by repeated invocations to the sub-problems, while not violating appropriate constraints. It performs this task by creating the MLP above, where the numerical constraints in the MLP are translations of or are derived from actual manufacturing constraints. The columns of the master problem correspond to the mother-plate patterns generated by it. The master problem solves the MLP by using commercially available linear and integer programming solvers. The master problem selects a desirable subset of mother-plates based on the solution of the MLP. The overall flow of the master problem is described below and depicted in FIG. 9.

Figure 9:
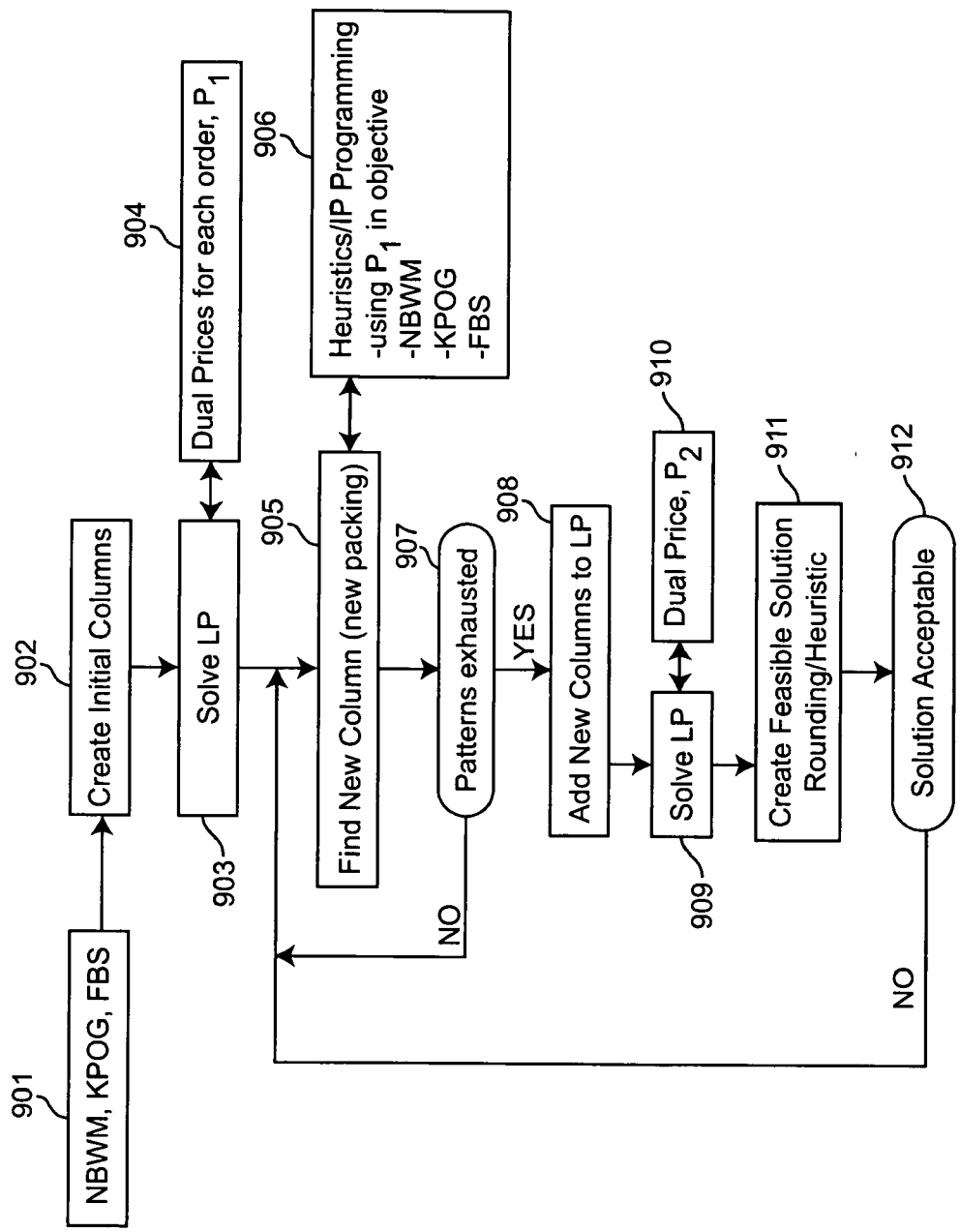
FIG. 9 is a flow diagram of the column generation process according to the invention.

The process shown in FIG. 9 begins when the sub-problems which create feasible mother-plate patterns, either simple or mosaic, are invoked in function block 901. In particular, the specific algorithms of NBWM, FBS and KPOG could be invoked to get feasible mother-plate patterns. In this invocation all orders have equal abstract profit values, say one. This invocation of function block 901 results in an initial list of mother-plate patterns. Based on this list a MLP is set up in 902, with the initial patterns corresponding to the initial columns of the MLP. A linear programming (LP) solver is called (usually off-the-shelf commercial software) to obtain a fractional solution to the MLP in 903. This solution assigns fractional numbers to the mother-plate patterns and has an associated objective value, and dual values for each constraint in the MLP. In particular, there are dual values for each order, representing abstract profit values for the orders (P1 in 904). At this point the master problem tries to improve the objective values of the MLP by creating new mother-plate patterns in function block 905. 905 invokes function block 906, which is very similar to 901, except that here the dual prices P1 are used to distinguish between orders; mother-plates are created with orders having higher "profit" or higher sums of dual values for the orders in the mother-plates. While the heuristics in 906 are able to obtain additional mother-plate patterns (NO to the question "patterns exhausted" in 907). They are iteratively invoked, and the new mother-plate patterns are collected in a list. This iterative process stops when an improvement in the objective function value is not possible or is too time-consuming. When no more patterns can be generated (YES in 907), the new list of mother-plate patterns is used to add a new set of columns to the MLP (in 908). A fractional solution to the MLP is obtained in 909, with new dual prices P2 (in 910). Finally an integer solution to the MLP is obtained in 911, either by using rounding heuristics or standard integer programming solvers. If the solution (or the mother-plate patterns corresponding to it) is acceptable in 912, the process ends, else we return to block 905 with the new dual prices P2 and repeat.

The repeated creation of columns is why the above framework is called a column generation framework. The important point here is that though there are an enormous number of possible mother-plate designs, the master-problem guides the creation of a small number of candidate designs. Another important point is that it chooses from a large set of candidates.

The master linear program not only yields a set of mother-plates to be used by other components, but also provides guarantees of how close to the best possible solution the returned solution is. This is a well-known property of linear programming based algorithms.

At the termination of the plate design component, a list of mother-plates and associated plate factories is available. Typically, a mother-plate can be manufactured from slabs with different thicknesses. For a specific slab thickness, there is flexibility in the slab width and length; that is, one mother-plate can be manufactured from many different slabs with different widths and lengths, but the same thickness. This is illustrated in FIG. 10.

Figure 10:
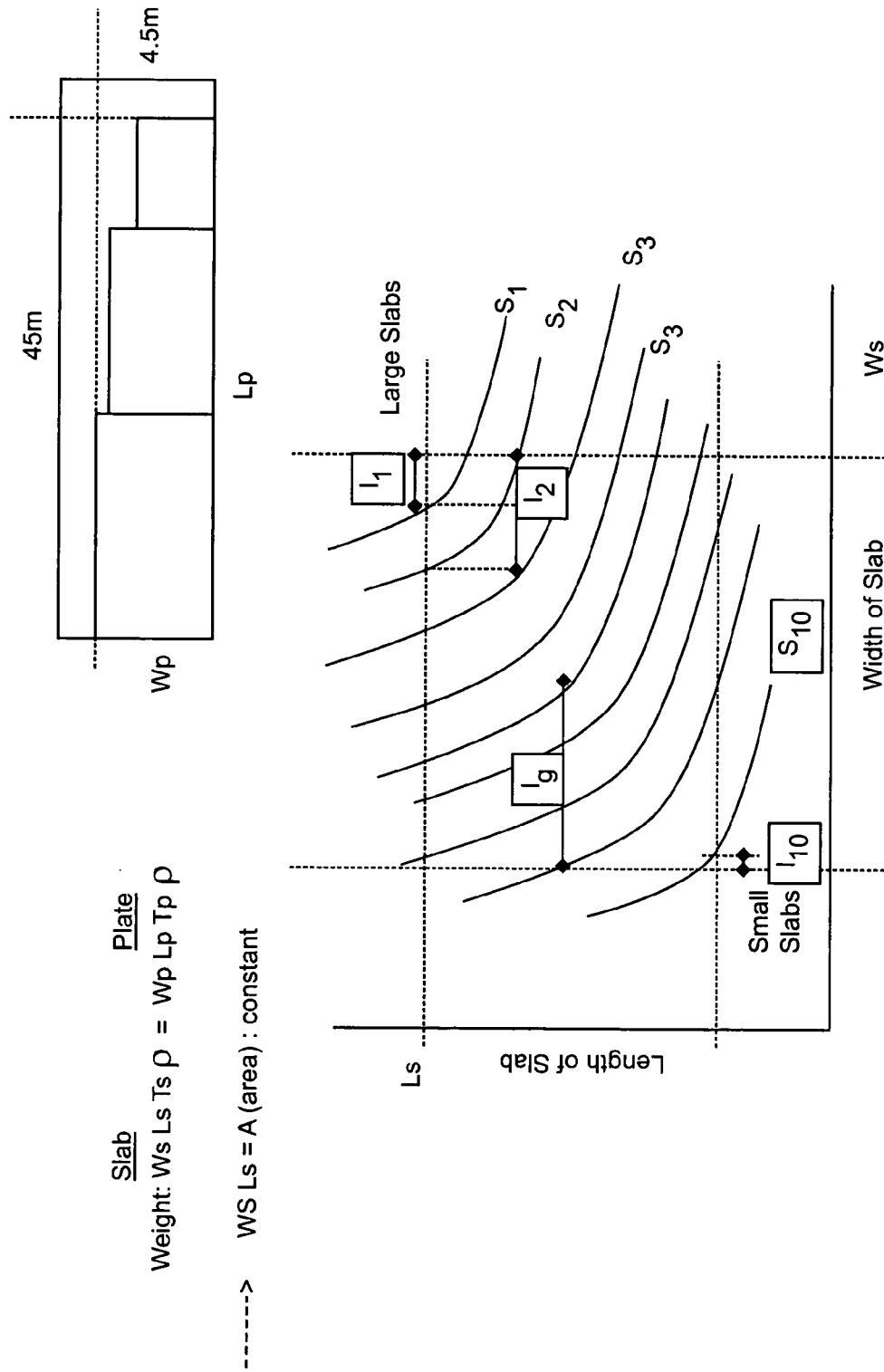
FIG. 10 is a diagram illustrating the slab component design following the plate design component of the invention.

FIG. 10 shows the relationship between mother-plate dimensions and slab dimensions and how slabs are designed after designing mother-plates. In steel plants, slabs are rolled to get mother-plates with different dimensions but having the same weight. Here Ws, Ls, Ts stand for the width, length and thickness, respectively, of a slab, and Wp, Lp, Tp stand for the width, length and thickness, respectively, of a mother-plate rolled from the slab. The Greek letter rho is the density of steel. Given Wp, Lp, Tp, and rho, and also Ts, the area "A"=Ws×Ls of the slab can be computed from the first equality shown in the figure.

Thus, for a given mother-plate and given slab thickness from which it is to be rolled, the slab area is fixed. This gives a relationship between Ws and Ls, which is plotted in the bottom right. Each curved line corresponds to one mother-plate (and to one slab), and plots the possible Ws, Ls values, where Ws×Ls=slab area ("A"). Thus, S1 is a slab, and the associated curved line is a plot of its possible length versus its possible width. Smaller slab areas (S10) correspond to curved lines on the left of the plot, larger slab areas (S1) to lines on the right. In addition, there are usually minimum and maximum values of manufacturable slab widths and lengths, which restrict the slab widths to lie in intervals. For example, S1 can be manufactured with all widths in the interval 11, and still be made into the desired mother-plate.

A choice has to be made as to the geometry of the slab associated with a mother-plate. For each allowed slab thickness (there are typically only a few such thicknesses) a range of feasible widths and lengths (for each width, there is exactly one length) is computed in this stage. The choice of which slab thickness to choose is actually partly handled in the master linear program for plate design.

At the end of the slab design phase, a list of candidate slabs is available. A single mother-plate may correspond to multiple candidate slabs, each with a different slab thickness. Each candidate slab has its thickness specified but has a range of allowed widths (and corresponding lengths), as shown in FIG. 10. The goal of this component is to fix a width for each candidate slab and to group slabs having the same width and length into as few and as large "cast templates" as possible, as illustrated in FIG. 11.

Figure 11:
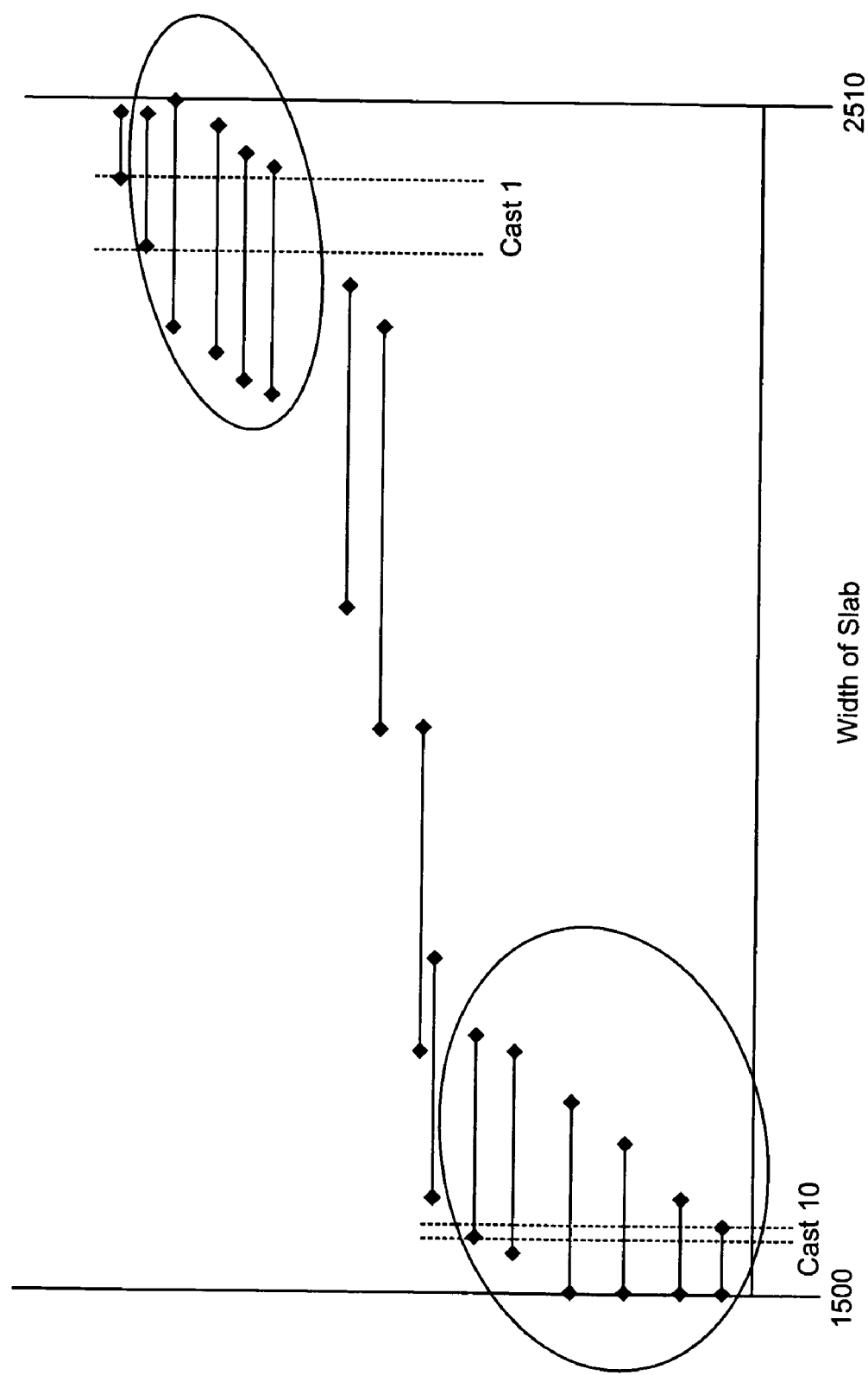
FIG. 11 is a diagram illustrating the cast template design process.

FIG. 11 shows a list of slabs, at the end of slab design process, which have to be grouped together to form casts. Each horizontal line represents a slab, or more precisely the possible widths for a slab. The two end-points of each line show the minimum (left end-point) and maximum widths (right end-point) allowed for the corresponding slabs, which can also be manufactured at all widths in between. All widths are measured on the same scale, and plotted on the x-axis. Two slabs can be placed in the same cast-template, if they can be manufactured with the same width; this is so if a vertical line can pass through both their width intervals. FIG. 11 depicts the grouping of slabs, based on their width intervals, into cast-templates. A cast-template itself has a possible range of widths, which is the largest common range of widths of its constituent slabs. In the figure, all slab width intervals lie in between 1500 mm and 2510 mm. Cast 10 consists of all slabs contained in the circle in the bottom left corner, cast 1 consists of slabs contained in the other circle. Based on its constituent slabs, Cast 10 has a possible width range specified by the two vertical lines in the bottom left. None of the remaining slabs can be added to either Cast 10 or Cast 1, as they don't share a common width with the allowed widths for either Cast 10 or Cast 1.

Typically, the sequence of slabs in a cast is also constrained, but we do not solve the sequencing problem here. Hence, we refer to a grouping of slabs with the same width and length as a "cast template" rather than a cast. It can be converted into a cast by arranging the slabs into a feasible sequence. Thus, the output of this component is a set of "good" cast templates in that each cast template contains many slabs.

Figure 12:
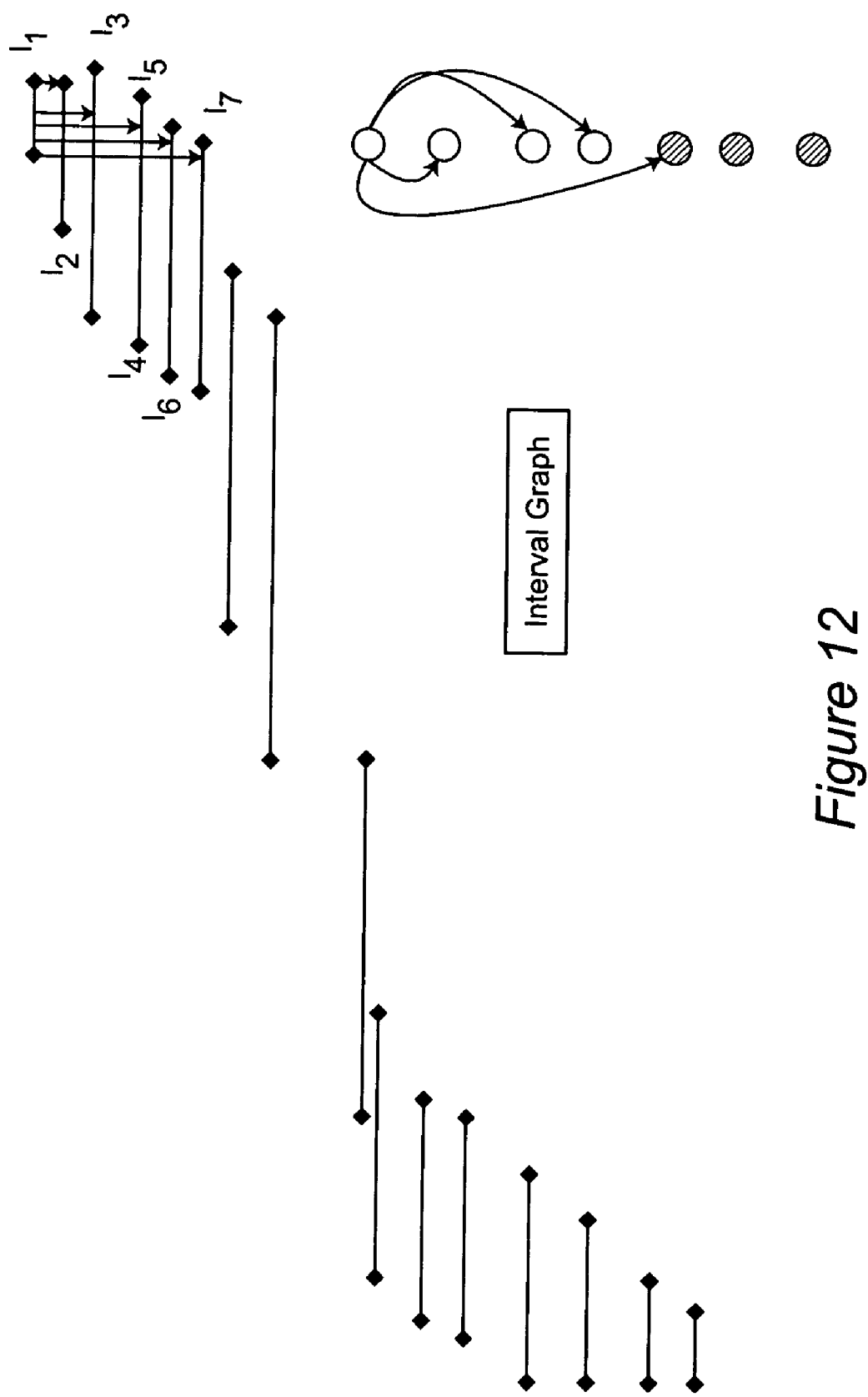
FIG. 12 is a diagram showing the interval graph of width range in the cast template design process.

Cast templates are created by representing the variability in widths of the candidate slabs via an interval graph, as shown in FIG. 12, and solving the "maximal clique in interval graphs" problem, which is a well-known and easy to solve problem in graph theory. To be more precise, the range of feasible widths for a slab lie in an interval. That is, there are numbers x and y such that x, y, and every number in between is a feasible choice for the width of a slab. If a number of slabs with the same thickness have intersecting width ranges, that is there is a common feasible width for all slabs, then they could be put together into a common cast template having the same common width, as shown in FIG. 11. A common width is desirable if it is feasible for many slabs; this would result in a large cast template. To find such common widths, we create a graph where each node (or point) represents a slab, and we create an edge (or line) between two nodes if the associated slabs have the same thickness and intersecting width ranges, as shown in FIG. 12. Only a partial interval graph is shown here. For example, there is a 'node' for the top-most slab, and for the next six slabs. The first and second 'nodes' are joined as the slabs share a common width. A clique is a set of nodes where each is connected to the rest in the set with an edge. A clique in the graph in FIG. 12 corresponds to a set of slabs which can be manufactured with a common width. A maximal clique is one which cannot be expanded by adding a node to the collection. We enumerate the maximal cliques in this graph. If a slab falls in two cliques, the tie between the two cast-templates is broken according to some criteria. We use each maximal clique to get a cast template, as shown in FIGS. 13 and 14.

Figure 13:
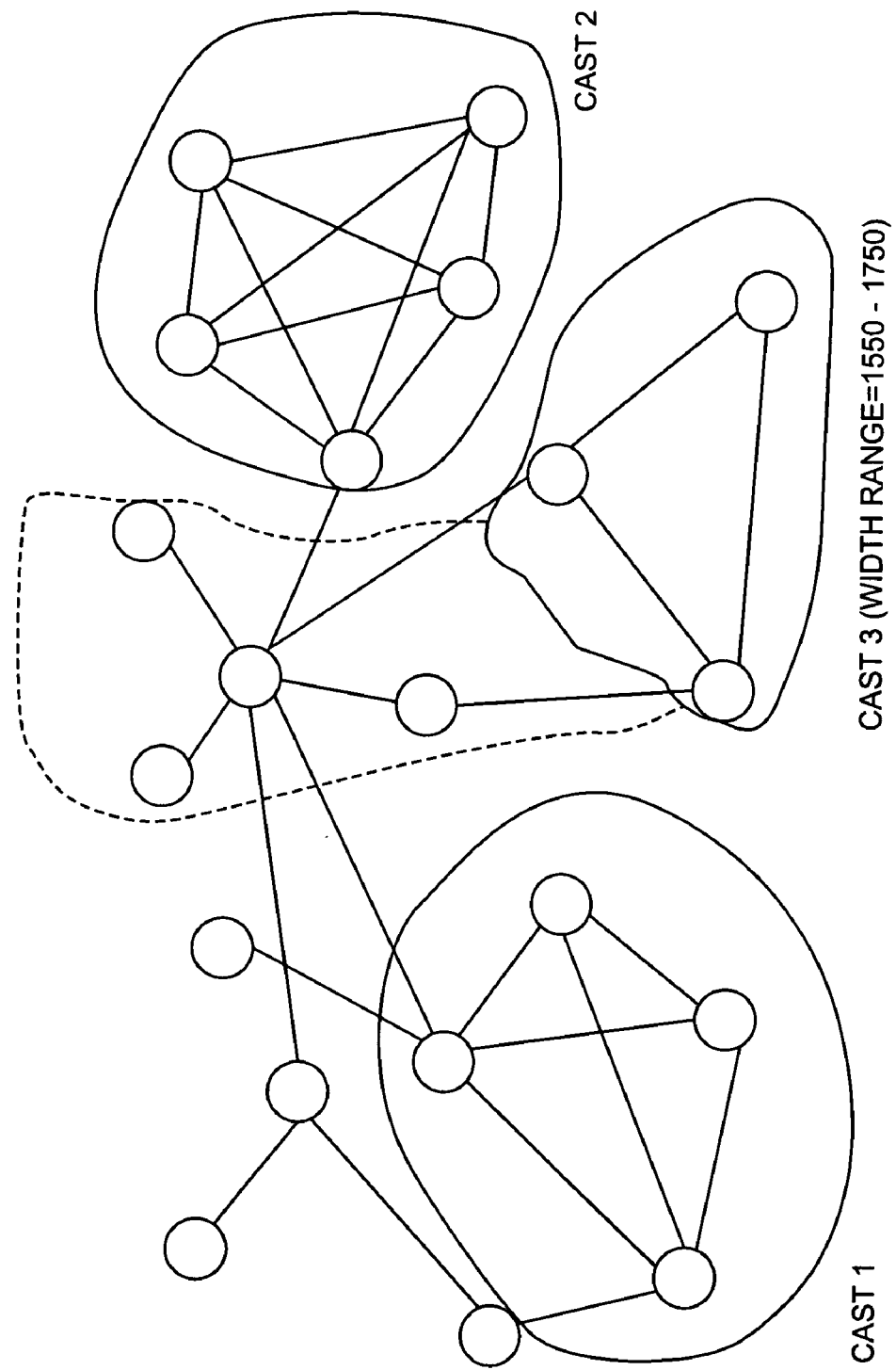
FIG. 13 is a diagram illustrating maximal cliques of the interval graph.

FIG. 13 shows a set of (three) maximal cliques in an interval graph. We group slabs in such maximal cliques into cast-templates. The wavy circles represent slabs in a cast-template. Finally a clique (cast-template) may be too small, i.e., it may not satisfy minimum manufactarability parameters, in which case it may need to be expanded by adding more slabs to the cast-template. The dashed line in FIG. 13 indicates a set of slabs which we may wish to add the (clique) cast template in the bottom middle; however the set of slabs to be added do not have a common width range with the slabs already in the clique, and may have to be redesigned. The redesign of slabs is explained later.

Figure 14:
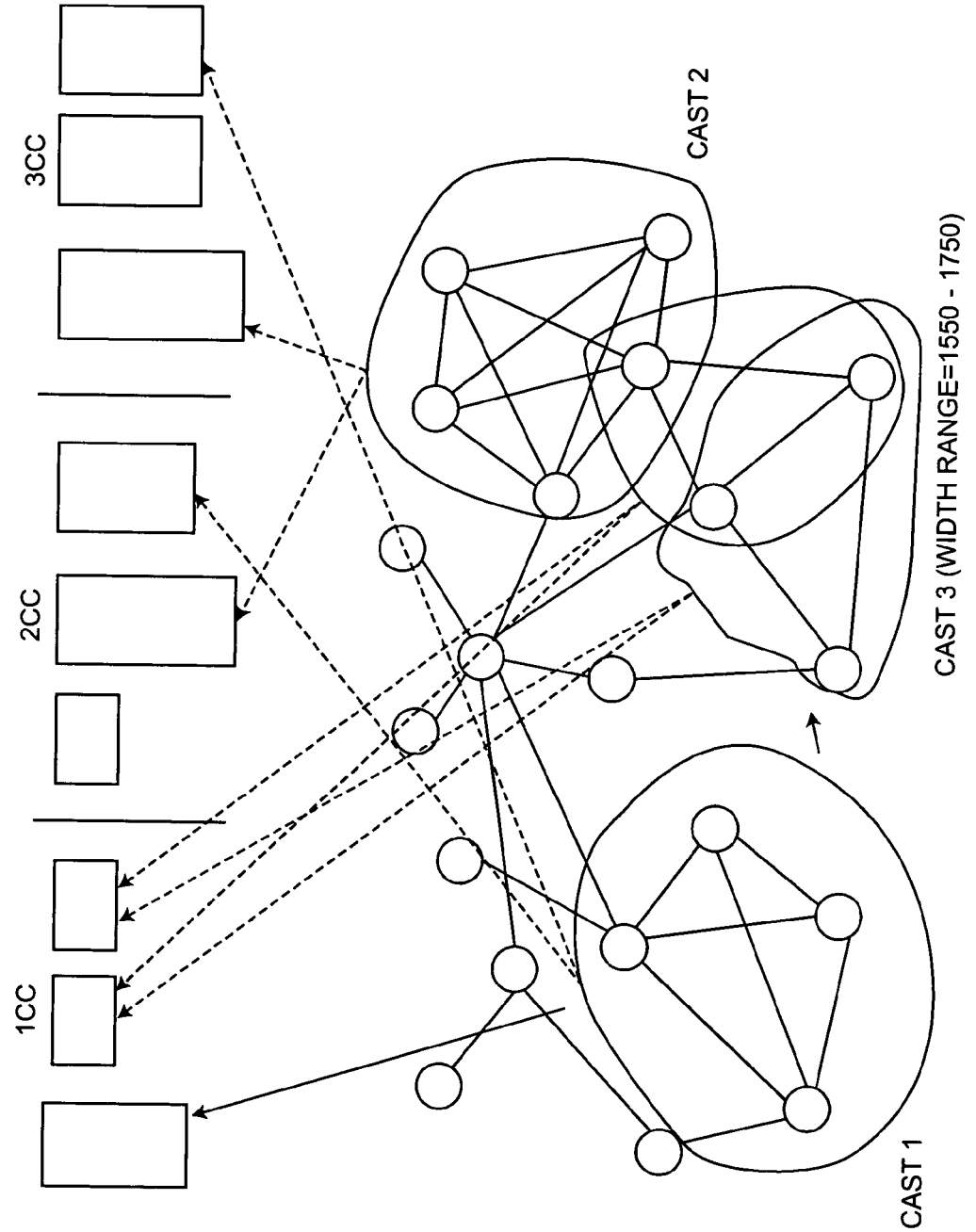
FIG. 14 is a diagram illustrating the process of matching cliques with cast capacity.

FIG. 14 shows a list of casting machines (1cc, 2cc, 3cc) and three plate factories (shown only implicitly). After slabs are cut from casts, they are sent to different plate factories to be rolled into mother-plates. There are typically capacity constraints on how much weight can be sent from each casting machine to each plate factory. In the figure, three plate factories are assumed. For each casting machine, the amount to be sent to each plate factory is represented by a blue rectangle, with the area of the rectangle representing the total weight of slabs to be sent to the corresponding plate factory (assume all are given in the same order, say 1, 2, 3, for each casting machine). When a clique (cast-template) is assigned to a casting machine, the slabs in the cast (which are to be made on specific plate factories) contribute to the weight of slabs going to plate factories from that casting machine. Thus cast-templates must be assigned to casting machines so as not to exceed casting capacities and plate factory capacities.

It may happen that the cast-template design phase does not find enough slabs of the appropriate geometries and cannot create good cast-templates, in that some cast-templates have too few slabs. It could also happen that the cast-templates cannot easily be converted into casts. In such a situation the cast-template process may wish to have more slabs of given thickness than exist in the output from the plate design/slab design phase. The algorithmic framework allows the cast template design component to communicate this information back to the plate design component (which modifies its constraints on the maximum manufactured quantity by slab thickness) and creates a new plate design (see FIGS. 3 and 15 to 18).

Figure 15:
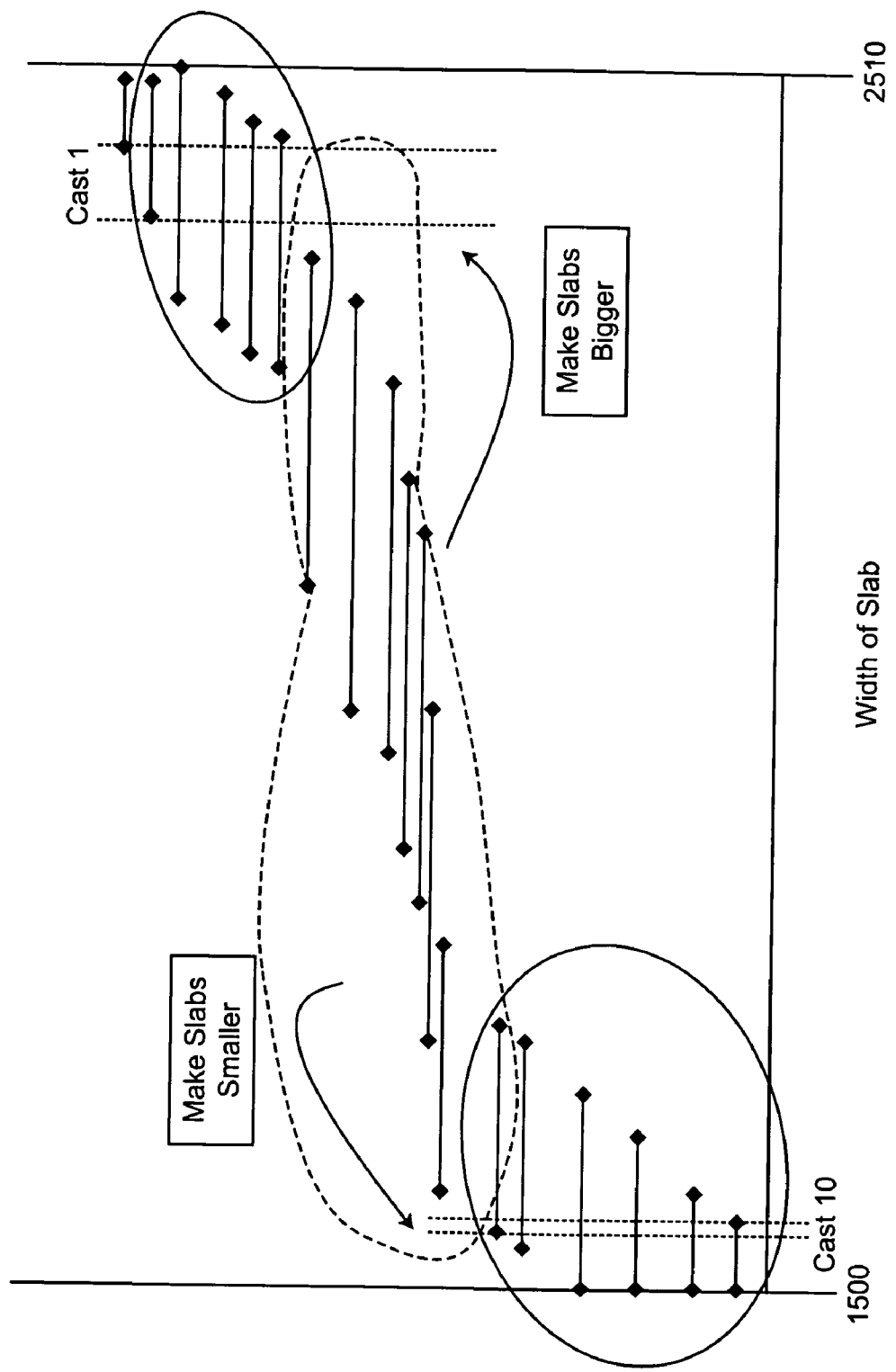
FIG. 15 is a diagram illustrating the cast template design process.

FIG. 15 illustrates some aspects of the plate redesign process. After cast-templates 10 and 1 have been formed (with slabs circled in the bottom left and top right, respectively), the slabs circled with a dashed line may be left over, and can go into neither cast-template.

Now if the weight of both cast-templates is less than the manufacturable minimum, new slabs have to be added to both cast-templates. In particular, new slabs which share a common width with the width range of cast 10 and cast 1 have to be manufactured. One way to do this is to modify the slabs left over. More precisely, one can take the orders packed on the mother-plates corresponding to the left over slabs, and create new mother-plates, and corresponding slabs which have either smaller width (these come from lower weight slabs), so that they can go into cast-template 10, or larger width (from higher weight slabs), so that they can go into cast-template 1.

Figure 16:
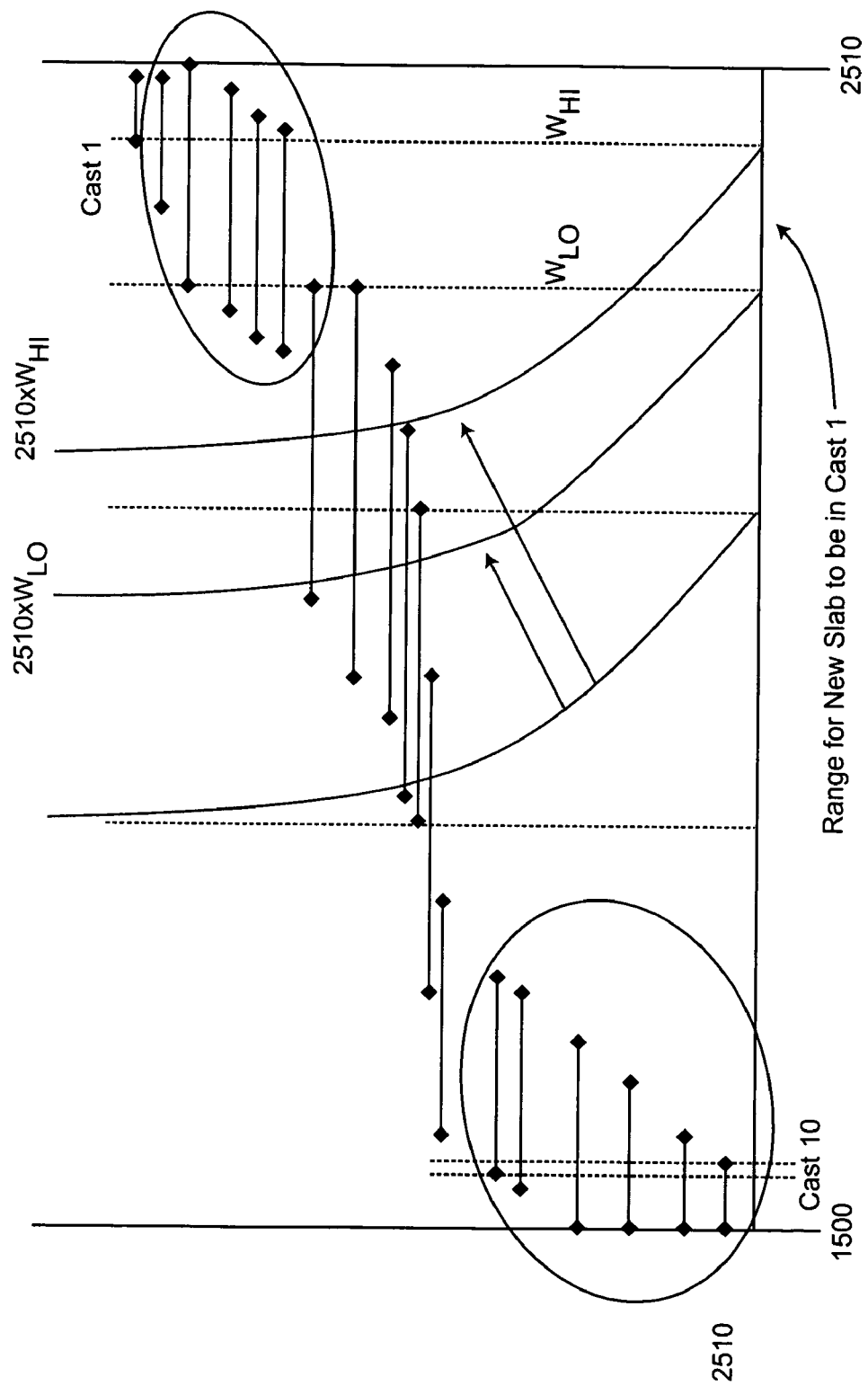
FIG. 16 is a diagram showing an example of plate re-design for a cast.

FIG. 16 illustrates computation of the new desired slab width ranges in the plate redesign process. Assume cast-template 1 needs additional slabs. The vertical lines marked by WLO and WHI stand for the minimum and maximum widths of cast-template 1 based on the slabs in cast-template 1; it can be manufactured with all widths in between. For a new slab to be added to cast-template 1, it needs to be manufacturable with a width in between WLO and WHI. Suppose the slab in the middle of the figure (shown by a dashed line) is to be redesigned with the same thickness. Its weight has to be increased which implies that its area increases; thus the width-length tradeoff curves (shown in FIG. 10) have to move to the right. Say the slab has to be manufactured with a length of 2510 mm. Then its area has to lie between 2510×WLO and 2510×WHI.

Figure 17:
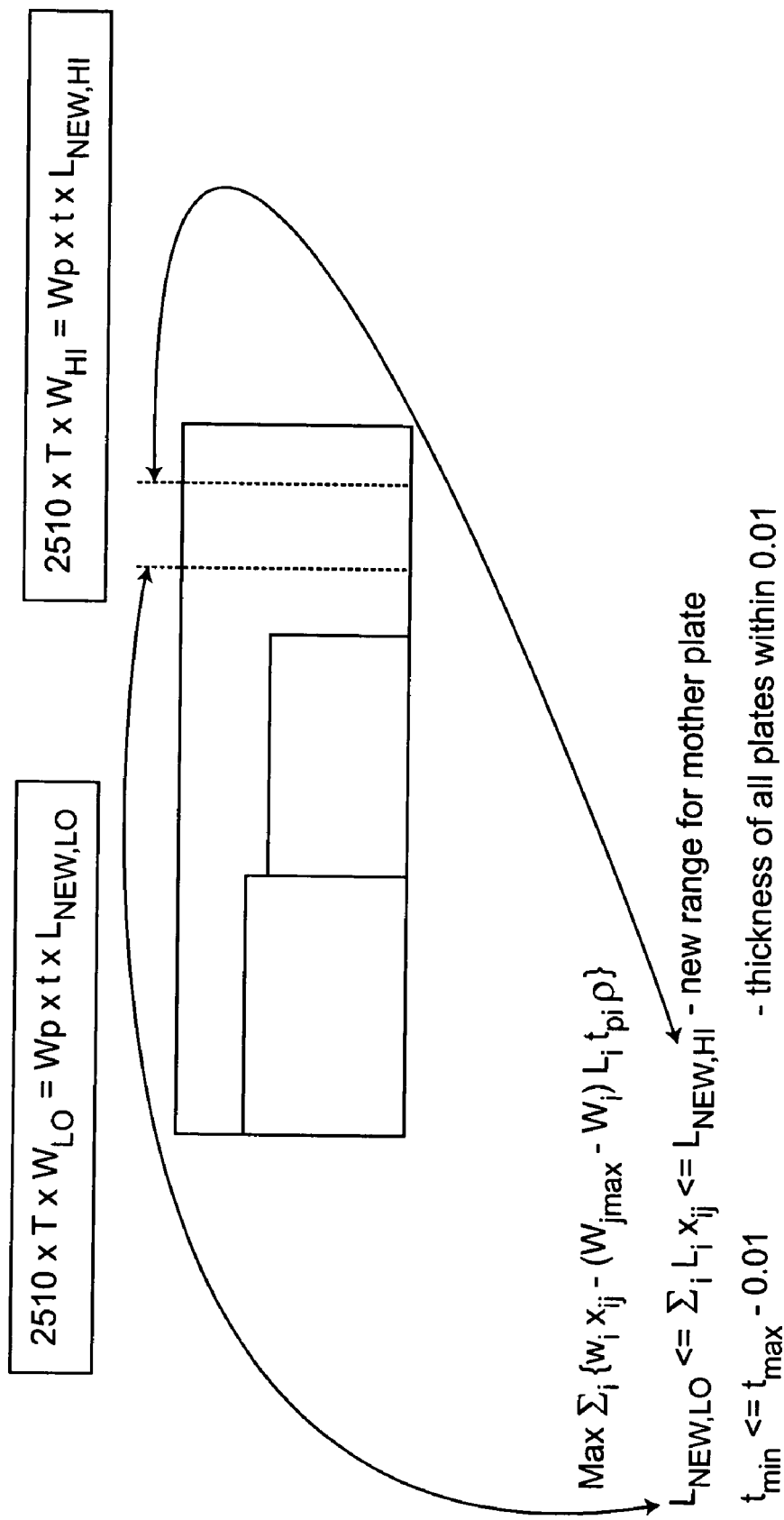
FIG. 17 is a block diagram, similar to FIG. 4, illustrating the plate re-design process.

FIG. 17 illustrates computation of the new desired mother-plate length ranges in the plate redesign process. Assume (as in FIG. 16) that we need slabs with widths between WLO and WHI and with thickness "T" and length 2510. Suppose we plan to roll it into a mother-plate with thickness "t" (say to cut out orders with thickness "t") and width "Wp". Since the weight (or volume) of the slabs and mother-plate are same, the minimum and maximum lengths LNEW,LO and LNEW,HI for the mother-plate (shown by the two vertical lines on the mother-plate) can be calculated by equating the minimum and maximum volumes of the mother-plate and slab as shown in the equation boxes at the top of the figure. From this one gets a constraint on how long the mother-plate should be, which modifies the original length constraint shown in FIG. 5.

Figure 18:
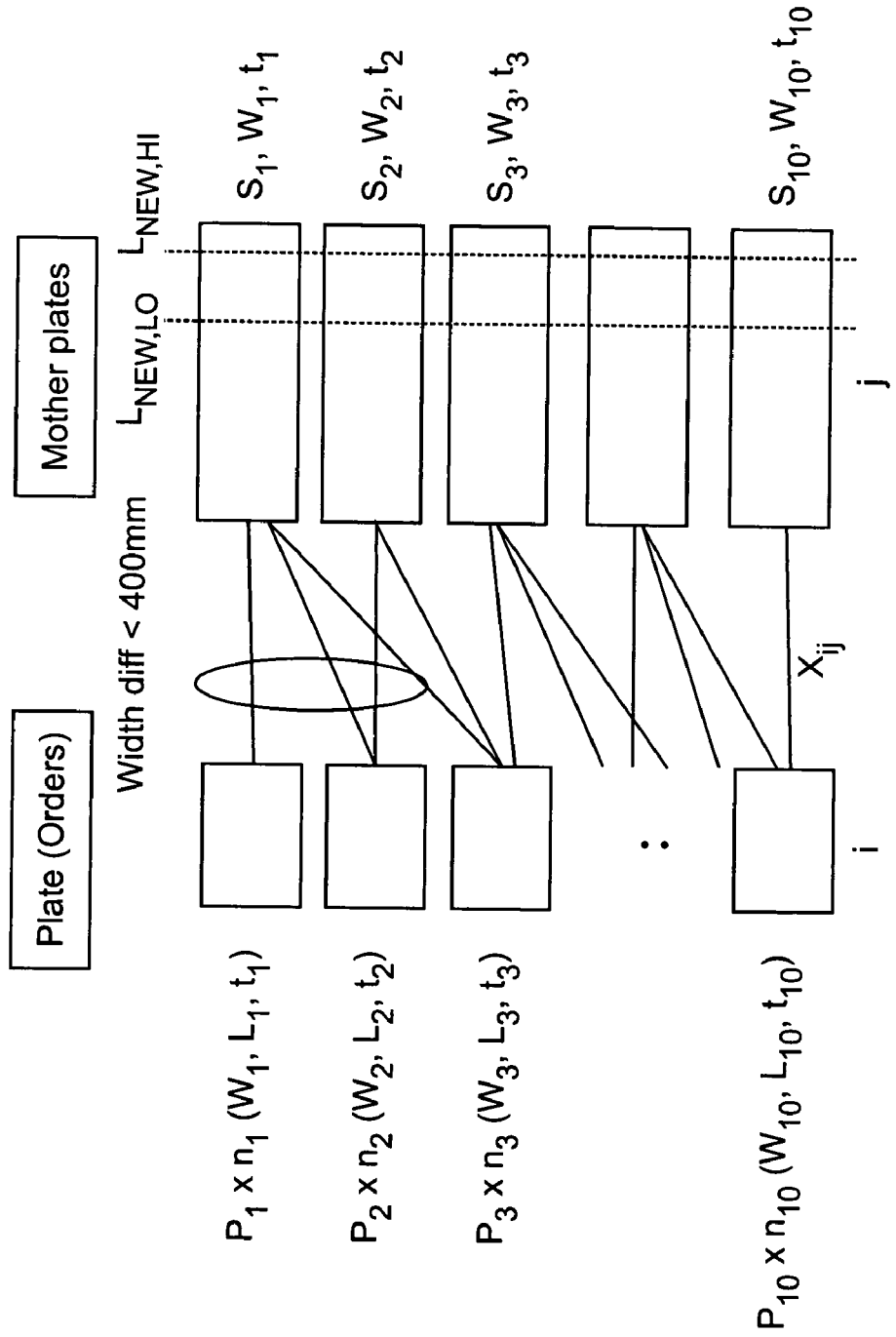
FIG. 18 is a diagram illustrating the plate re-design process for the mosaic case.

FIG. 18 modifies FIG. 4 by illustrating the "width-difference constraint" shown there in the presence of the additional length constraints (LNEW,LO and LNEW,HI) obtained in FIG. 17.

With this we conclude the description of three components of the invention, namely the mother-plate design component, the slab design component, and the cast design component. We also conclude the description of how they interact with each other.

Often some of the created slabs, mother-plates and order plates are unused and stored in inventory for future use. Before manufacturing new slabs and plates, the inventory is usually checked to see if some of the slabs and mother-plates can be used to produce the order plates using the manufacturing processes of slab rolling and plate cutting. We call this process material allocation. Our invention uses a column generation framework very similar to the one for the plate design problem. This framework has a different master problem but the same sub-problem as the plate design phase. Hence, we will only outline the master problem here.

The fundamental difference between material allocation and plate design is that in the first case we are trying to match existing slabs to order plates, whereas in the second we are designing new slabs. Otherwise, the constraints on machine capacities and geometries, on packing orders onto plates, on not overproducing for a particular order, are all the same. Hence, we create the master linear program for the material allocation problem by augmenting the master linear program for plate design in two ways. First, we add rows or constraints to ensure that created mother-plates correspond to slabs and unconditioned slabs and mother-plates in inventory. Second, we (implicitly) add extra columns for the existing orders in inventory.

The iterative process of calling the sub-problem repeatedly after solving the master linear program and setting abstract order profit values is identical to that in the plate design component.

Figure 19:
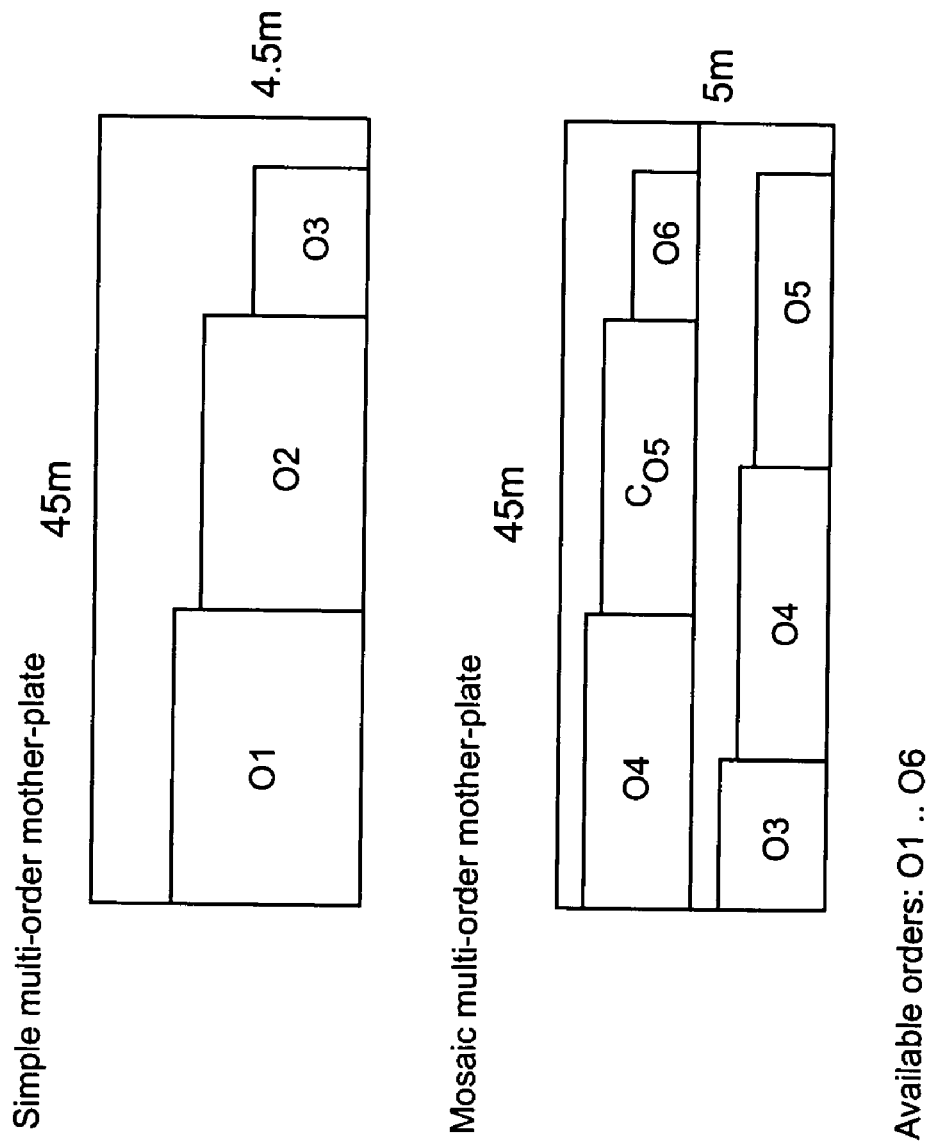
FIG. 19 is a diagram which illustrates two ways of cutting orders from mother-plates.

FIG. 19 illustrates two ways of cutting orders from mother-plates by giving two example mother-plates. Mother-plates are here depicted as rectangles (containing other rectangles which are order plates) with their length shown horizontally and width shown in the vertical direction. Thus, the first mother plate has length 45 meters and width 4.5 meters. Here order plates are shown as rectangles with the order numbers written in them.

The first mother-plate is a simple multi-order mother-plates (simple pattern for short), order plates "O1", "O2", "O3" are arranged horizontally along the length of the mother-plate without overlap. The empty space in the mother-plate (not covered by an order plate) is treated as waste. The second mother-plate is a mosaic multi-order mother-plates (mosaic pattern for short); here order plates are arranged both along the width and length of the mother-plate. Our invention deals with both types of mother-plates.

The invention provides a new way of doing integrated cast-template design and slab/plate design. The specific innovations are:

1) A column generation framework for plate design (which also handles some aspects of slab design), where variable size plates are allowed, and consisting of a master problem to choose from candidate mother-plate patterns and a sub-problem to give good candidate patterns.
2) Using an interval graph to represent candidate slabs and enumerating maximal cliques to get cast-templates.

3) A column generation framework for Material Allocation consisting of a master problem to choose from candidate mother-plate patterns for existing slabs and mother-plates and a sub-problem to give good candidate patterns.
4) Integrated cast-template design and plate/slab design where a column generation framework for plate design uses a master linear program to design plates and subsequently slabs for the cast-template design process, and the cast-template design process gives redesign information to the plate/slab design process.

We would like to mention that part of (1) and (3) can be found in the research literature and point out how our innovation differs from existing works. A well-known problem in the literature is the "cutting-stock problem". See references D. L. Applegate, L. S. Buriol, B. L. Dillard, D. S. Johnson, and P. W. Shor, "The Cutting-Stock Approach to Bin Packing: Theory and Experiments", Proceedings of ALENEX, 2003; Z. Degrave and L. Schrage, "Optimal Integer Solutions to Industrial Cutting Stock Problems, INFORMS Journal on Computing, 11 (1999), pp. 406-419; P. Gilmore and R. Gomory, "A linear programming approach to the cutting stock problem", Operations Research, 9 (1961), pp. 849-859; and P. Gilmore and R. Gomory, "A linear approach to the cutting stock problem—Part II", Operations Research, 11 (1963) pp. 863-888. This involves an infinite inventory of equal sized mother-plates or finitely many different size mother-plates, and the goal is to cut out given order plates from the existing inventory. The standard approach for this problem is to use a column generation framework with a master problem to choose between candidates and sub-problems to generate candidate patterns. Our invention differs in the following ways:

i) In innovation (1) above, we do not have fixed-size inventory plates available; we have to design varying size plates.
ii) In innovation (3) above, we have inventory slabs in addition to inventory plates. As slabs can be rolled in varying size mother-plates, we effectively have a combination of fixed-size and varying-size inventory mother-plates.
iii) Finally, our invention provides a way of performing integrated cast-template design and plate/slab design, which issue is absent in the cutting-stock literature.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for production design and operations scheduling for steel plate design comprising the steps of:
    implementing a column generation framework for varying size plate design consisting of a master problem to choose from candidate mother-plate patterns and a sub-problem to give good candidate patterns;
    using an interval graph to represent candidate slabs and enumerating maximal cliques to get cast-templates;
    implementing a column generation framework for material allocation consisting of a master problem to choose from candidate mother-plate patterns for existing slabs and a sub-problem to give good candidate patterns; and
    integrated cast-template design and plate/slab design where a column generation framework for plate design uses a master linear program to design plates and subsequently slabs for the cast-template design process, and the cast-template design process gives redesign information to the plate/slab design process.

2. An automated method to optimally design plates to satisfy an order book at a steel plant and specify a sequence of operations required to create the designed plates, given various constraints on machines and manufacturing parameters, comprising the steps of:
    implementing a column generation framework for mother-plate design to create a list of mother-plates that need to be produced, wherein a mother-plate design problem is decomposed into a master problem and a sub-problem, the master problem being used to evaluate packing patterns that should be used to fulfill an order book and the sub-problem generating potential one-dimensional and two-dimensional feasible packing patterns as candidates to be evaluated by the master problem;
    transforming mother-plates into an interval graph representing the candidate slabs to be cast which is subsequently solved for maximal subsets to generate candidate casts; and
    allocating material using a column generation framework very similar to the one in the mother-plate design component to allocate order plates to mother-plates and slabs already in inventory.

3. The automated method recited in claim 2, wherein the sub-problem creates feasible mother-plate patterns using specific algorithms selected from the group consisting of Non-Bipartitie Weighted Matching (NBWM), First-Best Strip (FBS) and KnaPsack with fixed Orientation and Guillotine cuts (KPOG).

4. The automated method recited in claim 2, wherein the step of transforming comprises the steps of:
    setting up a Master Linear Program (MLP) based on results in an initial list of mother-plate patterns, with the initial patterns corresponding to the initial columns of the MLP; and
    calling a linear programming (LP) solver to obtain a fractional solution to the MLP.

5. The automated method recited in claim 4, wherein the fractional solution assigns fractional numbers to the mother-plate patterns and has an associated objective value, and dual values for each constraint in the MLP.

6. The automated method recited in claim 5, wherein there are dual values for each order, representing abstract profit values for the orders and wherein the master problem tries to improve the objective values of the MLP by creating new mother-plate patterns.

7. A computer readable medium containing an executable computer program for an automated method to optimally design plates to satisfy an order book at a steel plant and specify a sequence of operations required to create the designed plates, given various constraints on machines and manufacturing parameters, the executable computer program implementing the steps of:
    implementing a column generation framework for mother-plate design to create a list of mother-plates that need to be produced, wherein a mother-plate design problem is decomposed into a master problem and a sub-problem, the master problem being used to evaluate packing patterns that should be used to fulfill an order book and the sub-problem generating potential one-dimensional and two-dimensional feasible packing patterns as candidates to be evaluated by the master problem;
    transforming mother-plates into an interval graph representing the candidate slabs to be cast which is subsequently solved for maximal subsets to generate candidate casts; and allocating material using a column generation framework very similar to the one in the mother-plate design component to allocate order plates to mother-plates and slabs already in inventory.

8. The computer readable medium recited in claim 7, wherein the sub-problem creates feasible mother-plate patterns using specific algorithms selected from the group consisting of Non-Bipartitie Weighted Matching (NBWM), First-Best Strip (FBS) and KnaPsack with fixed Orientation and Guillotine cuts (KPOG).

9. The computer readable medium recited in claim 7, wherein the step of transforming comprises the steps of:
setting up a Master Linear Program (MLP) based on results in an initial list of mother-plate patterns, with the initial patterns corresponding to the initial columns of the MLP; and calling a linear programming (LP) solver to obtain a fractional solution to the MLP.

10. The computer readable medium recited in claim 9, wherein the fractional solution assigns fractional numbers to the mother-plate patterns and has an associated objective value, and dual values for each constraint in the MLP.

11. The computer readable medium recited in claim 10, wherein there are dual values for each order, representing abstract profit values for the orders and wherein the master problem tries to improve the objective values of the MLP by creating new mother-plate patterns.

* * * * *